(12) United States Patent
Burr

(10) Patent No.: US 8,761,448 B1
(45) Date of Patent: *Jun. 24, 2014

(54) GESTURE PRE-PROCESSING OF VIDEO STREAM USING A MARKERED REGION

(71) Applicant: Intel Corporation, Santa Clara, CA (US)

(72) Inventor: Jeremy Burr, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/800,910

(22) Filed: Mar. 13, 2013

Related U.S. Application Data

(63) Continuation-in-part of application No. 13/713,849, filed on Dec. 13, 2012.

(51) Int. Cl.
*G06K 9/00* (2006.01)

(52) U.S. Cl.
USPC ............ 382/103; 382/165; 382/190; 348/135

(58) Field of Classification Search
None
See application file for complete search history.

(56) References Cited

U.S. PATENT DOCUMENTS

| | | | | |
|---|---|---|---|---|
| 5,280,530 | A * | 1/1994 | Trew et al. ..................... | 382/103 |
| 5,982,350 | A * | 11/1999 | Hekmatpour et al. ......... | 345/629 |
| 6,067,125 | A * | 5/2000 | May .............................. | 348/607 |
| 6,301,370 | B1 * | 10/2001 | Steffens et al. ............... | 382/103 |
| 7,181,081 | B2 * | 2/2007 | Sandrew ........................ | 382/254 |
| 7,436,981 | B2 * | 10/2008 | Pace .............................. | 382/103 |
| 7,634,108 | B2 * | 12/2009 | Cohen et al. .................. | 382/103 |
| 7,796,827 | B2 * | 9/2010 | Lin ................................ | 382/260 |
| 8,019,170 | B2 * | 9/2011 | Wang et al. ................... | 382/239 |
| 8,428,311 | B2 * | 4/2013 | Dariush et al. ................ | 382/115 |
| 2011/0299774 | A1 | 12/2011 | Manders et al. | |
| 2012/0069168 | A1 | 3/2012 | Huang et al. | |
| 2012/0262486 | A1 | 10/2012 | Raghoebardajal et al. | |

FOREIGN PATENT DOCUMENTS

| | | |
|---|---|---|
| KR | 10-2008-064856 A | 7/2008 |
| KR | 10-2012-0005674 A | 1/2012 |

OTHER PUBLICATIONS

"faceAPI—The Real-Time Face Tracking Toolkit for Developers and OEMs", faceAPI Brochure, 2008, 4 pgs.
"NPointer—Gesture-based navigation and control", Webpage by NEUROtechnology—Biometric and Artificial Intelligence Technologies, printed from http://www.neurotechnology.com/npointer.html on Nov. 29, 2012, Copyright © 1998-2012 Neurotechnology, 2 pgs.
International Search Report and Written Opinion received for PCT Patent Application No. PCT/US2013/074135, mailed on Mar. 18, 2014, 10 pages.

* cited by examiner

*Primary Examiner* — Manav Seth
(74) *Attorney, Agent, or Firm* — Finch & Maloney PLLC

(57) ABSTRACT

Techniques are disclosed for processing a video stream to reduce platform power by employing a stepped and distributed pipeline process, wherein CPU-intensive processing is selectively performed. The techniques are particularly well-suited for hand-based navigational gesture processing. In one example case, for instance, the techniques are implemented in a computer system wherein initial threshold detection (image disturbance) and optionally user presence (hand image) processing components are proximate to or within the system's camera, and the camera is located in or proximate to the system's primary display. In some cases, image processing and communication of pixel information between various processing stages which lies outside a markered region is suppressed. In some embodiments, the markered region is aligned with, a mouse pad or designated desk area or a user input device such as a keyboard. Pixels evaluated by the system can be limited to a subset of the markered region.

27 Claims, 20 Drawing Sheets

US 8,761,448 B1

GESTURE PRE-PROCESSING OF VIDEO STREAM USING A MARKERED REGION

RELATED APPLICATION

This application is a continuation-in-part of U.S. application Ser. No. 13/713,849 filed Dec. 13, 2012 and titled "Gesture Pre-Processing of Video Stream to Reduce Platform Power." In addition, this application is related to U.S. application Ser. No. 13/801,111 filed Mar. 13, 2013 and titled "Gesture Pre-Processing of Video Stream Using Skintone Detection." Each of these applications is herein incorporated by reference in its entirety.

BACKGROUND

The majority of computer usages for end-users connect the end-user to the Internet, and occur through a browsing interface. Common usages and activities include, for example, search engine based browsing, email, social networking, content consumption (e.g., news article and video viewing), content sharing (e.g., photos, music, etc), online shopping and purchasing, and maps and directions, just to name a few. Such common Internet usages generally entail some form of user-based navigation, such as that typically done with a mouse or touchpad and a keyword.

In effort to improve the user navigation experience, gesture-based navigation techniques have arisen. In particular, user hand movements can be recorded by a so-called webcam and translated into pointer movements. A typical gesture-based navigation application that operates in conjunction with the webcam is able to emulate the actions that are usually performed with a regular mouse or a touchpad: clicks, double-clicks, drags and scrolls. A user may also use head movements to control the computer or otherwise effect navigation. There are two basic methods for implementing human-body gesture using cameras: gestures using objects with so-called markers (where markers deployed in the field of view interact with the camera sensor), and markerless gestures (such as markerless hand gestures). Markerless gesture techniques can be implemented using either three-dimensional or 3D cameras (with Z-depth) which are typical for observation distances in the range of about 3 to 5 meters (m), or two-dimensional or 2D cameras (interpreting 3D motions from 2D information) which are typical for observation distances in the range of about 0.5 m.

Graphics processing in a computing environment such as a desktop computer or workstation, laptop or tablet, or game console generally entails a number of complex operations. Such operations include, for example, those with respect to ensuring that images are properly and timely rendered, as well as those with respect to gesture recognition. There are a number of non-trivial issues that arise in the context of such operations.

DETAILED DESCRIPTION

Figure 1A:
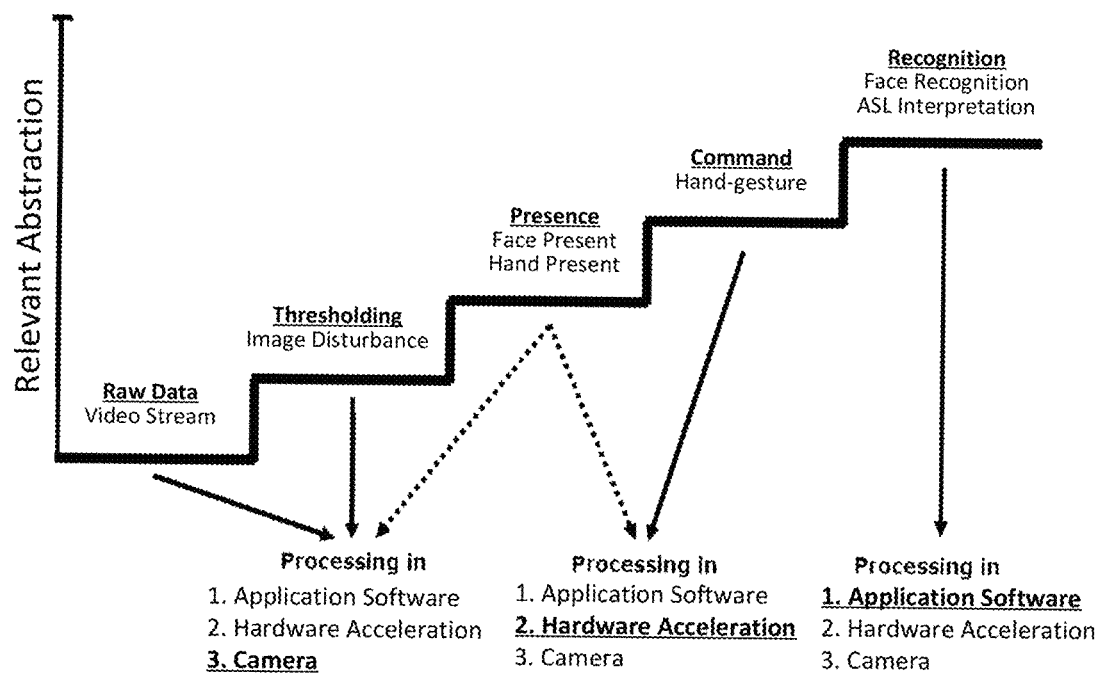
FIG. 1a graphically illustrates a stepped, distributed process for carrying out gesture pre-processing of a video stream to reduce platform power consumption, in accordance with an embodiment of the techniques disclosed herein.

Techniques are disclosed for processing a video stream to reduce platform power by employing a stepped and distributed pipeline process, wherein CPU-intensive processing is selectively performed. The techniques are particularly well-suited for efficient hand-based navigational gesture processing of a video stream, in accordance with some embodiments. The stepped and distributed nature of the process allows for a reduction in power needed to transfer image data from a given camera to memory prior to image processing. In one example case, for instance, the techniques are implemented in a user's computer system wherein initial threshold detection (image disturbance) and optionally user presence (hand image) processing components are proximate to or within the system's camera, and the camera is located in or proximate to the system's primary display. To further assist in reducing power consumption, image processing and communication of pixel information between at least some of the various processing stages which lies outside a markered region is eliminated or otherwise suppressed, in some embodiments. The markered region can be a subset of a given field of view, and is some example cases is aligned with a mouse pad or designated desk area or a user input device such as a keyboard, wherein the markered region is defined by a perimeter of that mouse pad, desk area, or input device. To further conserver processing power, a number of pixels evaluated by the system can be limited to a subset of the markered region. In still other example cases, the markered region is a user-configurable subset of a given field of view. The computer system may be, for example, any mobile or stationary computing system having a display and camera that are internal and/or external to the system.

General Overview

As previously explained, there are a number of non-trivial issues that arise in the context of graphics processing, particularly with respect to gesture recognition. For instance, the workloads that perform typical 2D and 3D video image processing for gesture recognition consume relatively large amounts of input/output (IO) power, and max out central processing unit (CPU) utilization and platform thermal design power (sometimes referred to as TDP) budget. Such problems are exacerbated in applications where the camera is 'always-on' and providing images for processing and therefore power is being consumed even when nothing relevant is going on within the visual image. For instance, capturing image information and pushing it to the CPU for processing can easily consume in excess of 10 watts, even for a simple gesture or otherwise computationally simple task. Most image processing workloads typically involve more computationally complex tasks and operate at or near the maximum video processing power available, and are inherently limited by CPU utilization and power budget. As such, image processing applications can consume all available CPU cycles, leaving no or otherwise inadequate CPU processing capability for other applications. The camera power itself is a relatively small fraction of the video capture power (including platform controller hub, CPU, and memory power) needed to transfer the image data from the camera to memory prior to image processing. The image processing algorithms are effectively self-limiting by these factors and would consume much more power if it were available. For instance, typical algorithms self-limit frame rate to 15 frames per second (FPS), when better recognition would occur with higher FPS. Thus, it is possible that maximum platform power can be consumed with video image processing even when there is no imagery of interest (e.g., gesturing, etc) to be analyzed.

Thus, and in accordance with an embodiment of the techniques disclosed herein, techniques for processing a video stream to reduce platform power are disclosed. While the techniques can be used with respect to processing any type of video content, they are particularly well-suited for efficient hand-based navigational gesture processing of a video stream, in accordance with some embodiments. Example hand gestures are also provided herein. The techniques may be implemented in a stepped and distributed fashion, such that the power needed to transfer image data from a given camera to memory prior to image processing is greatly reduced. In one example case, for instance, the techniques are implemented in a user's computer system wherein pre-processing components are proximate to or within the system's camera, and the camera is located in or proximate to the system's primary display. The computer system may be, for example, a laptop or netbook (wherein the display is a lid-type display), or a desktop or work station computer or a gaming console (wherein the display is an external display), or a tablet or smart phone (wherein the display is an integral part of the user interface and housing of the computing system). The display can be, for example, an LCD or CRT, or touch screen display, and may be integral with the computing device (e.g., tablet, laptop, mobile phone) or external to the computing device (e.g., desktop, laptop or tablet). The camera can be, for example, a single 2D camera or webcam, although any suitable camera technology can be used, including 3D cameras or so-called stereo camera pairs, and may be integral with the computing device and/or display or external.

In accordance with one example embodiment, the pre-processing components include a Threshold Detection stage, Target Presence stage, a Segmentation stage, a Hand Parser stage, and Gesture Recognition stage. The Threshold Detection stage is generally configured to determine if a video frame is effectively empty. If the frame is not empty or has changed in a meaningful way from the last frame, then processing transitions to the Target Presence stage, which is configured to find targeted pixel colors, specifically pixels whose colors match the characteristics of skintone. If sufficient skin-colored pixels are found to suggest a finger may be present, then processing transitions to the Segmentation stage, which is configured to separate pixels of interest from pixels that are not of interest and can therefore operate as an adaptive skintone detect stage (skintone/non-skintone edge detection). In one example configuration, this stage transforms a color video frame into an image of blobs, which can be encoded as a monochromatic or grayscale image. Blobs are used to represent areas of skin-colored pixels. This stage also be configured to correct for camera noise and lighting differences, and to smooth the blobs using erode and dilate morphing methods, in accordance with some example embodiments.

The Hand Parser stage is configured to perform spatial interpretation of the blob data produced by the Segmentation stage, and attempts to map blob data to human anatomical geometry. The correlation choices largely depend on the use case and assumptions about the camera's viewing angle of the person carrying out the navigation gestures, in accordance with an embodiment. Sometimes only edge data is required, sometimes filled-blob data is required, and sometimes articulated hand models are required, depending on the scenario. As will be appreciated, anatomically-specific parsing may be difficult to generalize and thus difficult to put into a fixed-function solution, depending on the complexity of the body part being imaged. In this use case, however, fingers can be detected at the Hand Parser stage, for example, by analyzing the edges of a hand blob. For instance, the Hand Parser stage may be configured for comparing the slopes of the edges to identify the locations of peaks (fingertips). Thumbs and index fingers can be located from within the hand blob, and these can be used as targets for the gesture recognition tasks, in accordance with some example embodiments. One particular example hand gesture that can be detected by the Hand Parser Stage in accordance with an example embodiment is an ovoid-based gesture, such as when the thumb and index finger of a user's hand are brought together so that they touch or a similar gesture but open at the end such that the thumb and index finger are not touching. The Gesture Recognition stage is configured to perform temporal interpretation of the anatomy/hand data generated by the Hand Parser stage. For example, if the Gesture Recognition stage is used for detecting mouse-equivalent operations, it may look for location changes of the fingertips and/or hand of the user. In one such example case, ovoid-based hand gestures can be used to simulate mouse movement as well as click-and-release actions (single click, double click, etc). Such gestures can be analyzed within a markered region.

Note that not all of these five pre-processing stages have to be proximate to or within the computing system's camera. Nor do they all have to be in or proximate to the computing system's display to achieve power savings. For example, if the Threshold Detection and Target Presence stages are the only stages implemented in the camera sensor proximate the display, and the remaining stages are implemented in the CPU (e.g., as part of a Gesture API that will be discussed in turn), such an embodiment would still achieve considerable power savings, as will be appreciated in light of this disclosure. Also, different use models may indicate different implementation strategies. For example, it may be desirable to have two modes of operation: a 2D mode for Internet navigation (more casual use that involves relatively low-complexity gestures), and a 3D mode for more intensive applications (e.g., CAD manipulation, Photoshop that may involve relatively high-complexity gestures). In such embodiments, the 2D mode may be wholly performed in the camera sensor (at the expense of increased camera cost), while the 3D mode may perform the first two or three stages in the camera sensor and then pass the raw image data up to the Gesture API for the gesture processing steps performed by the CPU of the computing system (or pass that raw image data onto specialized software applications). In both the 2D and 3D modes, power savings are achieved, especially when nothing of interest is occurring within the camera's field of view (FOV).

In some embodiments, the logical connection of the various stepped and distributed pre-processing components to the computer system is implemented as a gesture application programming interface (hereinafter, 'Gesture API'). The Gesture API may be presented, for example, as an extended universal serial bus human interface (USB HID) class device, in accordance with some embodiments. In general, the Gesture API effectively exposes information from the various pre-processing stages (Threshold Detection, Target Presence, Segmentation, Hand Parser, and Gesture Recognition), so that such information can be utilized by other parts of the computing system, if so desired. In some embodiments, the API may further be programmed or otherwise configured to include security/privacy policies so as to prevent, for example, access to the CPU or other resources of the computing system by unsecured information from the video stream.

As will be appreciated in light of this disclosure, the gesture pre-processing video stream techniques provided herein may be used for any number of applications, including improving hand-gesture-based Internet navigation as well as hand-gesture-based computer navigation. One specific such application where the techniques can be applied is markerless hand gesture recognition using 2D cameras at distances of about 0.5 m. However, the techniques can be applied to numerous other applications including 3D-based applications, if so desired. Numerous use models will be apparent in light of this disclosure, such as a notebook or netbook on a desk or user's lap or park bench, desktop or notebook or netbook with one or more external displays at home or office, desktop or notebook or netbook in work/cubicle environment, notebook or netbook on coffeehouse table, notebook or netbook on conference room table, notebook or netbook on airplane tray top, and Internet café (e.g., desktop with one or more external displays), just to name a few.

As will be further appreciated in light of this disclosure, power consumption for video processing tasks within a computing system should ideally be commensurate with the level of abstraction of the raw image data obtained from the computing system's camera sensor. In other words, raw image data consumes minimal power, incrementally more power is consumed to threshold the image, yet more power to detect presence, etc. To this end, the pre-processing components effectively embody a stepped or graduated sequence of operations, where incrementally more power is consumed at each stage in the progression to produce higher levels of relevant information or meaning within the video stream's image, in accordance with an embodiment. Note, however, some embodiments may have some intermediate stages that use more power than later stages, and the present disclosure is not intended to be limited to stages that exhibit any particular progression of power consumption. For instance, in some embodiments, the Segmentation stage is more computationally intensive than the other four stages combined. In the aggregate, the pre-processing components collectively and efficiently can analyze a raw (uncompressed) video stream, or subset of the video stream, to determine meaning or relevance within the video stream's image. The pre-processing components may be implemented, for example, in hardware (e.g., Register Transfer Language such as Verilog or VHDL, or other gate-level logic or purpose-built semiconductor), or software/firmware (e.g., microcode executing in a microcontroller).

System Architecture

FIG. 1a graphically illustrates a stepped, distributed process for carrying out gesture pre-processing of a video stream to reduce platform power consumption, in accordance with an embodiment of the techniques disclosed herein. As can be seen, there are five distinct levels of data abstraction that effectively can be partitioned between distributed performance primitives and the CPU of the computing system. These levels include Raw Data, Thresholding, Presence, Command, and Recognition. As can be further seen, the processing associated with each of these levels of data abstraction can be carried out in (or near) the camera, or in the graphics processing unit (GPU) hardware acceleration, or in the application software executing on the CPU.

The Raw Data may be, for example, an encoded video stream or a raw image stream. Raw Data generally indicates image data that has not been compressed, whereas an encoded video stream is typically compressed. Compression algorithms are typically used to fit large amounts of data through low bandwidth communications channels, and this is typically done within the camera sensor silicon. Data compression typically reduces the fidelity of the image and makes image processing more difficult. At the Thresholding level, thresholding may be done to detect a disturbance in the image so as to coarsely identify the presence of user activity. For example, such coarse identification would detect the transitioning from a stream of data frames with no user present to a stream of data frames with a user present, as indicated by user movement (video content) and/or user speech (audio content). As can be seen in this example embodiment, each of the Raw Data and Thresholding levels can be processed within or otherwise near the camera.

Once such a coarse identification is made at the Thresholding level, the presence of specific user features in the content can then be identified at the Presence level. For instance, the specific user feature may include a user's face and/or hand. As can be seen with further reference to the example embodiment depicted in FIG. 1a, this particular level of processing may be carried out within or otherwise near the camera in some cases, or by the GPU as an accelerated process in other cases, depending on the complexity of image analysis involved (e.g., face analysis may be more complex than hand analysis).

Once such a refined identification of specific user feature(s) being present in the content stream is made, those user feature(s) can then be generally assessed for gesturing at the Command level. For instance, face and/or hand activity can be generally assessed for a command-like gesture like a motioning hand or a turning of the head. As can be seen with further reference to the example embodiment depicted in FIG. 1a, this particular level of processing may be carried out by the GPU as an accelerated process. The GPU may be, for example, co-located with the CPU in some cases, or may be operatively coupled to the CPU via a bus structure. In the latter case, the GPU may be on the same mother board as the CPU, or may be external to the motherboard (e.g., on a dedicated graphics processing card that is operatively coupled to the motherboard, or on an external graphics processing device that is operatively coupled to the computing system via a communication port).

Once a command-like gesture is identified, that gesture can then be assessed for a specific command at the Recognition level. The command might be, for example, a user navigation command for directing an online shopping process that the user is executing. For instance, with respect to video content, a face-based gesture can be subjected to face recognition, and/or a hand-based gesture can be subjected to analysis to identify hand gestures compliant with American Sign Language (ASL), so as to identify a given command. As can be seen with further reference to the example embodiment depicted in FIG. 1a, this particular level of processing may be carried out by application software executing on the CPU.

Figure 1B:
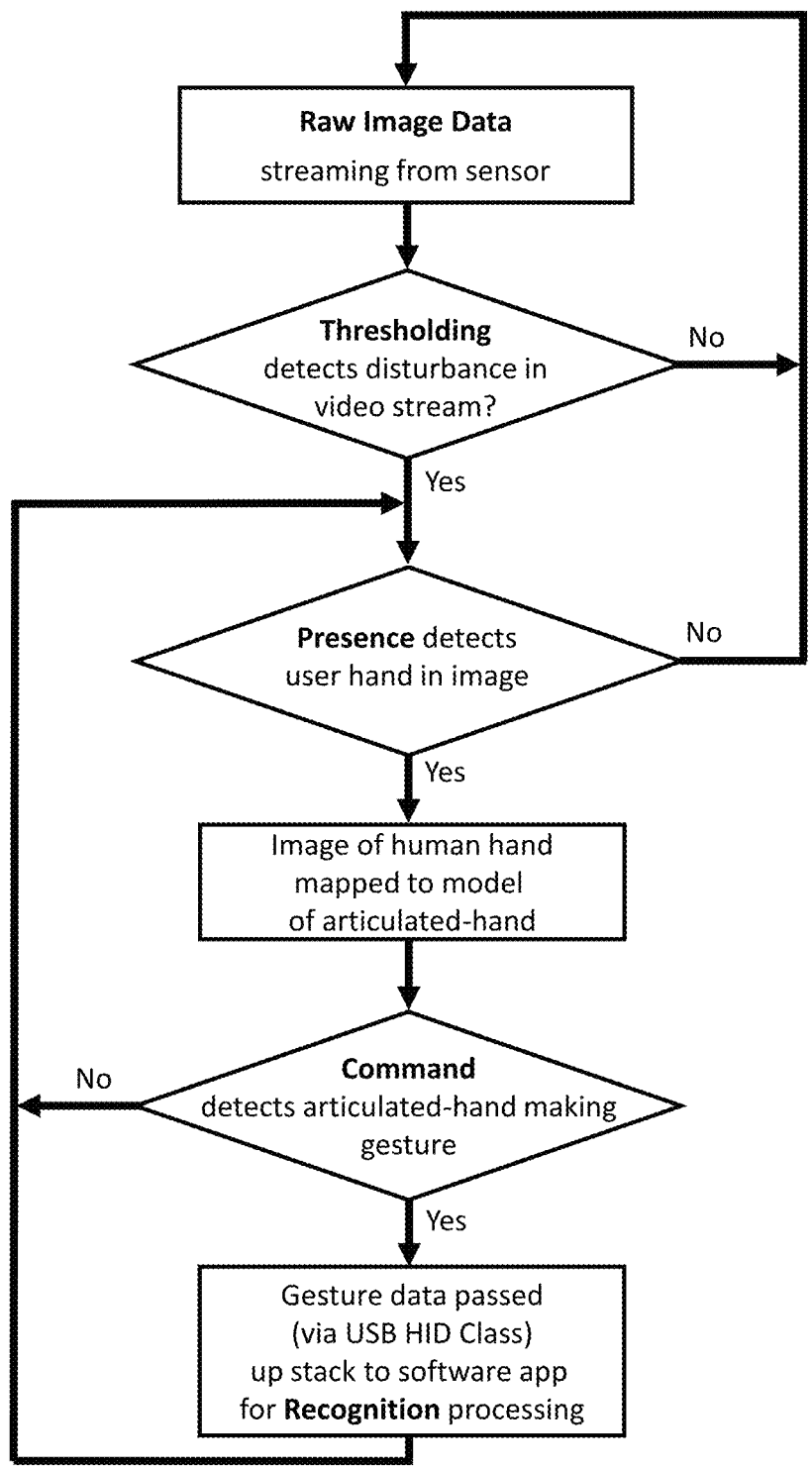
FIG. 1b illustrates a flow diagram of the stepped, distributed process of FIG. 1a, in accordance with an embodiment.

FIG. 1b illustrates a flow diagram of the stepped, distributed process of FIG. 1a, in accordance with an embodiment. As can be seen in this example embodiment, a video camera is used to generate raw image data of a user's hand activity at a given computer set-up. In other embodiments, the video content to be processed may include the user's face activity. Regardless of the content type, the stepped and distributed techniques provided herein for pre-processing media content can be equally applied in a similar fashion, as will be appreciated in light of this disclosure.

The flow begins with receiving Raw Image Data streaming from the sensor, which may include one or more cameras. If more than one camera is used, each video stream can be processed accordingly, as discussed herein. At the Thresholding level, the video stream is analyzed to detect a disturbance in the video stream. In one example embodiment, a detection signal can be issued if the current video frame is more than 10% different than the previous video frame. The threshold may be different from one embodiment to the next (e.g., 5% or more, or 50% or more, etc), and can be set as desired given factors such as the particular environment being observed for a given computing system (use case) set-up and the desired degree of sensitivity to changes in that environment/system. If the pre-established coarse threshold is not exceeded, then the process continues with receiving and monitoring Raw Image Data. However, if the coarse threshold is exceeded, the process continues at the Presence level with detecting a user hand in the image. As previously explained, in some embodiments, the pre-processing at the Thresholding and Presence levels can be carried out in the camera circuitry, or in dedicated circuitry that is configured to deploy proximate to the camera and to operatively couple with the camera over a relatively short distance (e.g., less than 0.1 m, such as 0.05 m or less, or directly coupled to the camera housing via a bus structure or other suitable communication port), such that IO power is reduced relative to the IO power that would be used if all image content from the camera was provided to the application software executing on the CPU. As will be appreciated, the present disclosure is not intended to be limited to any particular range of distance between the dedicated circuitry and the given camera sensor; rather the concepts provided herein of using a stepped, distributed pre-processing scheme can be implemented in any number of configurations. If the image does not include anything that is recognizable as the user hand, then the process continues with receiving and monitoring Raw Image Data.

However, if the image does include content recognizable as the user's hand, then the process continues at or otherwise toward the Command level with mapping the imaged hand to a model of an articulated-hand associated with a known hand gesture. In some such example embodiments, the imaged hand is compared to a plurality of such models, and a similarity score is determined for each model. The process continues at the Command level with determining whether or not the image includes a hand making a known gesture. In some such cases, for instance, the model yielding the highest similarity score can be identified as a match. In other cases, the first model encountered that has a similarity score that exceeds a pre-established threshold can be identified as a match (so that all models need not necessarily be tested). As previously explained, this Command level pre-processing can be carried out as a GPU accelerated process, in some embodiments. If it is determined at the Command level that the image does not include a hand making a known gesture, the process returns back to the Presence level so as to continue with analysis of the video stream as to whether or not there is a user hand in the image. As will be appreciated in light of this disclosure, the Command level may inform the Presence level of its findings (e.g., no blob data) so that processing at the Presence level proceeds in an educated fashion.

However, if it is determined at the Command level that the image does include a hand making a known gesture, then the process continues with passing the gesture data to the application software for processing at the Recognition level. As previously explained, this level of processing tends to be CPU intensive. Further note in this example case that the gesture data is passed up the stack via a USB HID API (Gesture API). This API will be discussed in turn, with reference to FIG. 8. As will be further appreciated, note that the Command level determination may be sufficient to definitively identify a known hand gesture, and subsequent processing at the CPU-based Recognition level will need not be performed, thereby further saving on CPU-based power consumption.

Thus, by doing at least some degree of gesture pre-processing of a video stream within or otherwise near the camera can substantially reduce power consumption which may be particular helpful in mobile computing devices (e.g., laptops, netbooks, tablets, smart phones, etc). This is because, in general, a majority of video processing involves relatively low-complexity processing that can be carried out in distributed circuitry that is configured and located to reduce IO activity and CPU workload, and the remaining percentage of processing that involves higher complexity processing can be sent as raw data to the GPU for accelerated processing and/or to the driver (application software) in the CPU for processing. In this sense, techniques provided herein reduce the need for software-based algorithms executed in general purpose CPU cores by using dedicated distributed performance primitives or hardware functions run in (or proximate to) the camera and GPU.

Figure 2A:
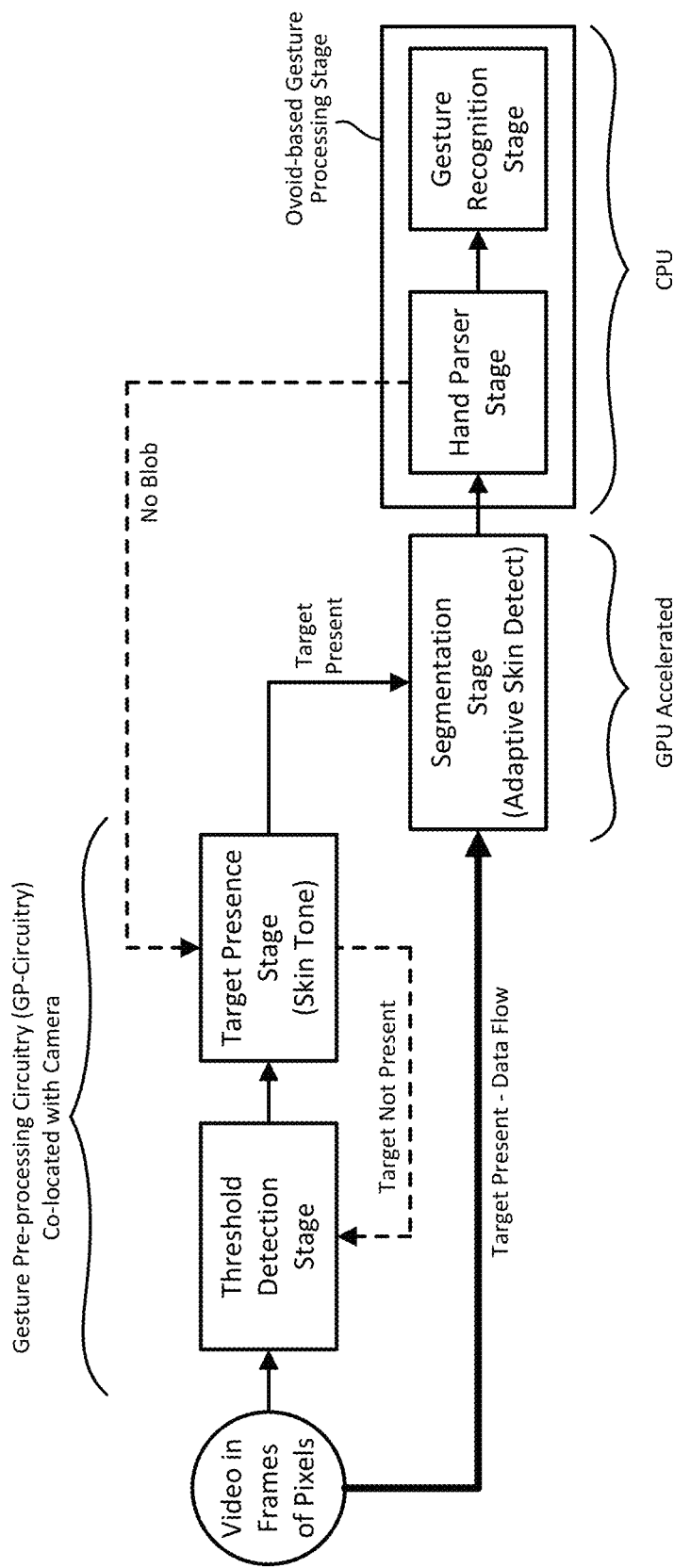
FIG. 2a illustrates a block diagram of a system configured for carrying out stepped, distributed gesture pre-processing of a video stream to reduce platform power consumption, in accordance with an embodiment of the techniques disclosed herein.

FIG. 2a illustrates a block diagram of a system configured for carrying out stepped, distributed gesture pre-processing of a video stream to reduce platform power consumption, in accordance with an embodiment of the techniques disclosed herein. As can be seen, the system is a gesture processing pipeline that is configured with a number of distributed components (five in this example case). In this example embodiment, two of the components—the Threshold Detection and Target Presence Stages, are implemented as gesture pre-processing (GP) circuitry that is within or otherwise proximate to the camera. As will be appreciated in light of this disclosure, the GP circuitry may be considered to be 'co-located' with the camera if it is actually integrated directly within the camera circuitry or is otherwise sufficiently proximate to the camera, so long as the GP circuitry is sufficiently close to the camera sensor so as to reduce IO power and CPU processing time, or is otherwise closer to the camera than is the CPU. Another component, the Segmentation Stage, is GPU accelerated. The other two components, the Hand Parser and Gesture Recognition Stages, are executed in the CPU of the computing system. In this example embodiment, these two stages can be used for ovoid-based gesture processing, as will be discussed in turn with respect to FIGS. 9a through 12. Variations on this stepped and distributed architecture will be apparent in light of this disclosure, where any such stepped and distributed architectures allows for an optimization with respect to active and idle power scenarios. In particular, the video processing components co-located with the camera and GPU are effectively more fixed-function thereby requiring less power than a traditional CPU solving the same computational problem.

As used herein, a 'GP-Circuitry' is an integrated circuit that is configured to carry out one or more of the five stages shown in FIG. 2a, that is implemented either within the camera providing the video stream to be analyzed, or that is implemented as a dedicated circuit configured to directly couple with that camera by a relatively short connection as previously explained (e.g., so as to reduce IO power and CPU cycles as compared to conventional techniques where all video is passed from camera to a CPU-based driver). Each of the co-located GP-Circuitry and camera can be integrated within the display, or external to the display, or some suitable combination. For instance, in some specific example embodiments, the GP-Circuitry may be implemented within the hinged display lid of a mobile computing device (e.g., laptop, netbook, etc) and proximate to a camera circuit that is also embedded within that lid. In other such example lid-based display cases, the GP-Circuitry may be implemented directly within the embedded camera itself. In other example cases, the GP-Circuitry may be implemented directly within an external camera that is configured to clip to or otherwise operatively couple, for instance, with a lid-based or external display of a computing system (e.g., desktop, laptop, etc). In still other example cases, the GP-Circuitry may be implemented in a discrete package and is configured to operatively couple with such an external camera. In still other example embodiments, the GP-Circuitry may be embedded within the housing of an external display and proximate to a camera circuit that is also embedded within that display. In other such example external display cases, the GP-Circuitry may be implemented directly within the embedded camera itself. As will be appreciated in light of this disclosure, the greater the degree of integration or proximity between the GP-Circuitry and the camera circuitry, the greater the reduction that can be achieved in IO power between the camera and GP-Circuitry image processing sub-system(s).

The Threshold Detection Stage is the first stage in the pipeline and is configured to coarsely determine if a video frame is effectively empty. If the current video frame is similar enough to the previous frame, then the frame is considered empty. This can be achieved, for example, using low power silicon that implements a simple algorithm that sums and compares the luma channel for each frame, in accordance with one such embodiment. If the video uses an RGB color space, then the green component is substituted in its place because most of the luma component of a YUV pixel is contained in the green component for an RGB pixel. If the delta between the current and previous is above a given threshold, this will trigger to move to the next stage. Otherwise, empty frames are not sent to the next stage, which helps to manage power when the user is not performing gestures. In some embodiments, the Threshold Detection Stage only examines pixels within a markered region, which is a subset of the overall FOV of the imaging system, and pixels outside this markered region are turn-off or otherwise ignored. The markered region can be defined, for example, by the perimeter of the user's keyboard or a mouse pad or some other detectable area within the FOV that is a logical place for a user to provide hand gestures. In some such embodiments, the user area may be user-configurable (e.g., by demarcating a given area with the FOV of a given system and calibrating/configuring the camera circuitry to only image that demarcated section during specific processing stages by turning off pixels outside that region). In still further embodiments, only pixels within a thresholding-event region that is a subset of the markered region are analyzed by the Threshold Detection Stage. As will be appreciated in light of this disclosure, allowing for only a relatively small detection area to be analyzed by the Threshold Detection Stage saves on processing power and can be a reliable predictor of user presence, particularly given a keyboard-based markered region or other such area that is intuitively breached by the user's hands during an intended gesture period. As will be further appreciated, using a thresholding-event region across the user's keyboard-based markered region can be used to further reduce processing power, and to further eliminate false-positive threshold events (e.g., while a user may breach the palm rest area of a keyboard-based markered region and not intend to gesture, it will be less likely that the user will breach a thresholding-event region across the A-GH-L keys or the keyboard-based markered region unless a gesture period is intended).

The Target Presence Stage is configured to implement a relatively low complexity method for finding targeted pixel colors, in accordance with an embodiment. In some cases, this stage looks for pixels whose color match characteristics of skintone. Matching against skintone can be carried out, for example, in silicon configured to convert an RGB (or YUV) data stream into an HSV pixel. Human skintone occupies a relatively limited range in hue, allowing for a fast, low-power fixed-function conversion and comparison. Note that the Target Presence Stage does not require any data storage or information for the previous frame. If enough skin-colored pixels are found in a scan-line to suggest that a finger might be present, then processing transitions to the next stage. Otherwise, frames with no target present or an insufficient number of skin-colored pixels are not sent to the next stage, which helps to manage power when the user is not performing gestures. Just as previously explained with respect to the Threshold Detection Stage, the Target Presence Stage can be configured to only analyze pixels within a designated markered region (e.g., keyboard-based markered region) or a thresholding-event region (e.g., A-GH-L keys or the keyboard-based markered region) of that markered region, and that discussion is equally applicable here. In other embodiments, a simplified skintone detection process can be employed, as will be discussed in turn.

The Segmentation Stage is configured to receive target present frames from the Target Presence Stage and to separate pixels of interest from pixels that are not of interest, in accordance with an embodiment. In one example case, this stage implements an adaptive skintone detection algorithm that transforms a color video frame into an image of blobs, which may be encoded as a monochromatic or grayscale image. In the case of a grayscale image, for example, nonzero pixels can be used to represent pixels of a blob and a black pixel indicates a non-blob pixel. Essentially, blobs are used to represent areas of skin-colored pixels. The adaptive skintone detection adapts the skin hue lower and upper bound based on the frame data. This also eliminates disperse pixel due to camera noise and lighting besides smoothening the objects using erode and dilate morphing methodologies. As is known, morphology is a mathematical method of processing digital images based on shape. Dilate morphing generally refers to an operation that expands or fills a target object. Erode morphing involves a similar methodology, but operates on background of the image rather than objects. Many GPUs have instructions that can be leveraged for an optimized implementation of the Segmentation Stage, as will be appreciated in light of this disclosure.

The Hand Parser Stage is configured to perform spatial interpretation of the blob data, in accordance with an embodiment. In one particular example case, the stage attempts to map the blob data to human anatomical geometry, such as the model of a human hand or a model of a human body, depending on the target gesture being evaluated. As will be appreciated in light of this disclosure, the way in which the Hand Parser Stage attempts to correlate blob data against human body parts/poses depends largely on the use case and the assumptions around the camera's viewing angle of the person. The way in which the blobs are interpreted can differ as well. In some example situations, it may be sufficient to determine human geometry using only the edge. In other scenarios, a filled-in blob is more appropriate. In some cases, the blob data coming from the Segmentation Stage may need additional processing to remove visual artifacts on the blobs that are detrimental to parsing them correctly, and the Hand Parser Stage may be configured to remove such artifacts. In the case of a camera configured to view the user's hand, fingers can be detected by analyzing the edge of a hand-blob. Comparing the slope at different sampling points on the edge can suggest the locations of peaks (e.g., fingertips). Further analysis of those peak-like blobs (in terms of distances and slopes between various pixels) can reveal that the fingertip is attached to a finger stem. If necessary, this stage can attempt to articulate a whole human hand, including locations of all 5 fingertips. In some cases, it may be sufficient to detect a single finger. In this sense, the usage model determines the amount of required analysis. As previously indicated, anatomically-specific parsing (e.g., hand parsing) can be difficult to generalize, and thus difficult to put into fixed-function silicon. Hence, the Hand Parser Stage is executed by the CPU, in some embodiments. One particular example hand gesture that can be detected by the Hand Parser Stage in accordance with an example embodiment is an ovoid-based gesture, such as when the thumb and index finger of a user's hand are brought together so that they touch (like an OK sign, but with the other three fingers more tucked in behind the index finger) or a similar gesture but open at the end such that the thumb and index finger are not touching. FIGS. 10a-f and 11a-f show examples of such closed and partially closed ovoid-based gestures, and will be discussed in turn.

Figure 9A:
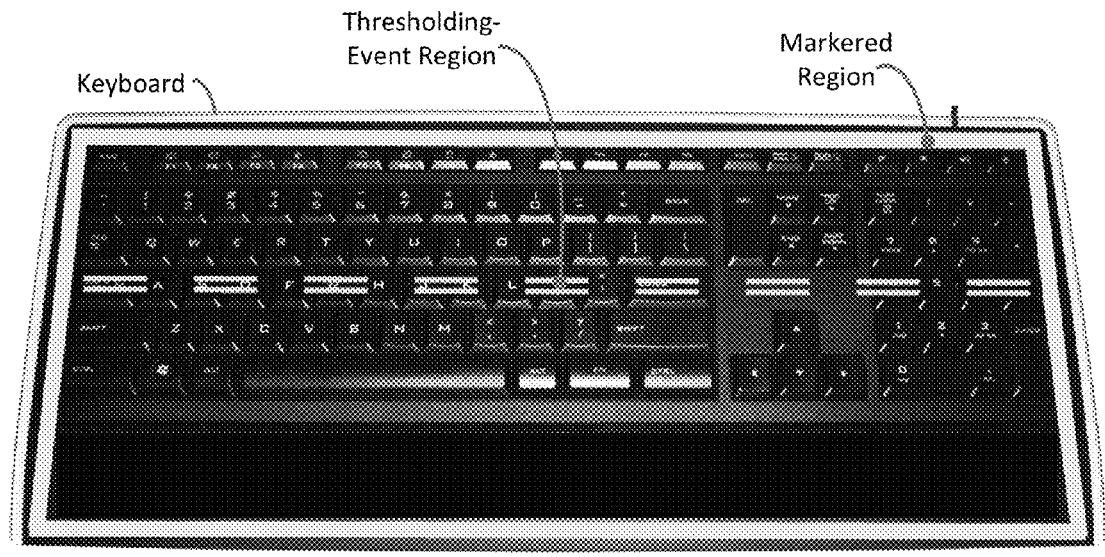
FIGS. 9a-b each illustrates an example markered region within the field of view a hand gesture video processing system that can be used to control a computer system, in accordance with an embodiment of the techniques disclosed herein.
Figure 9B:
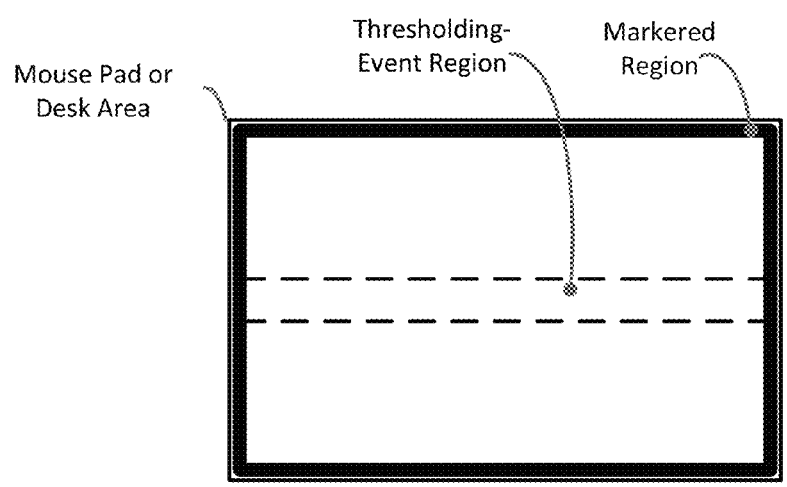

The Gesture Recognition Stage is configured to perform temporal interpretation of the anatomy/hand data (blob data received from Hand Parser Stage), in accordance with an embodiment. For example, if the stage is used for analyzing mouse or touchpad operations, it can look for changes in the location of one or more fingertips. In one such example case, ovoid-based hand gestures can be used to simulate mouse movement as well as click-and-release actions (single click, double click, etc), as will be discussed in turn with reference to FIGS. 10a-f and 11a-f. Such gestures can be analyzed within a markered region, such as shown in FIG. 9a or 9b. In some cases, motion blur that is in the original camera image can make it difficult for the Hand Parser Stage to articulate human anatomy. In such cases, the Gesture Recognition stage can exploit assumptions about the use case to improve reliability of the gesture interpretation. For example, if the Hand Parser Stage successfully detected a full finger in one frame but it could only determine a fingertip location in the next frame (e.g., could not confirm that fingertip was attached to a 'proper' finger), the Gesture Recognition stage could assume that it's the same finger in the next frame.

In general, the Segmentation, Hand Parser, and Gesture Recognition Stages may be configured to send feedback to either the Threshold Detection or Target Presence Stages. For example, and as can be seen in the example embodiment of FIG. 2a, if the Hand Parser Stage actually finds a large enough blob that might be a hand, it can signal the Threshold Detection Stage to reset the luma/green counter of the previous frame to zero, thereby forcing the next frame to indicate that it is a non-empty frame. In one specific example embodiment, this type of signaling can be implemented through a single pin/wire on the GP-Circuitry's Threshold Detection Stage silicon, which could be controlled from a driver, for example. Alternatively it could also be done over USB, in accordance with another embodiment. This helps to prevent a scenario where a non-moving hand causes the Threshold Detection Stage to think the hand is part of a static background. Another example feedback loop scenario would be to force the system to send the data directly from the camera to the Segmentation Stage, without sending it the Threshold Detection and Target Presence Stages, when a large enough blob is detected (as depicted in FIG. 2a and labeled Target Present—Data Flow).

This type of behavior may improve power by removing unnecessary threshold-related processing. Note, however, that while such feedback mechanisms may provide a further degree of optimization, they are not necessary in all embodiments. If implementation of these techniques is cost prohibitive, for example, an alternate solution is to fall back to the Target Presence Stage every 1 or 2 seconds to check if the target is continuously present. In such cases, the penalty paid for this is the loss of one frame worth of gesture command data.

Figure 2B:
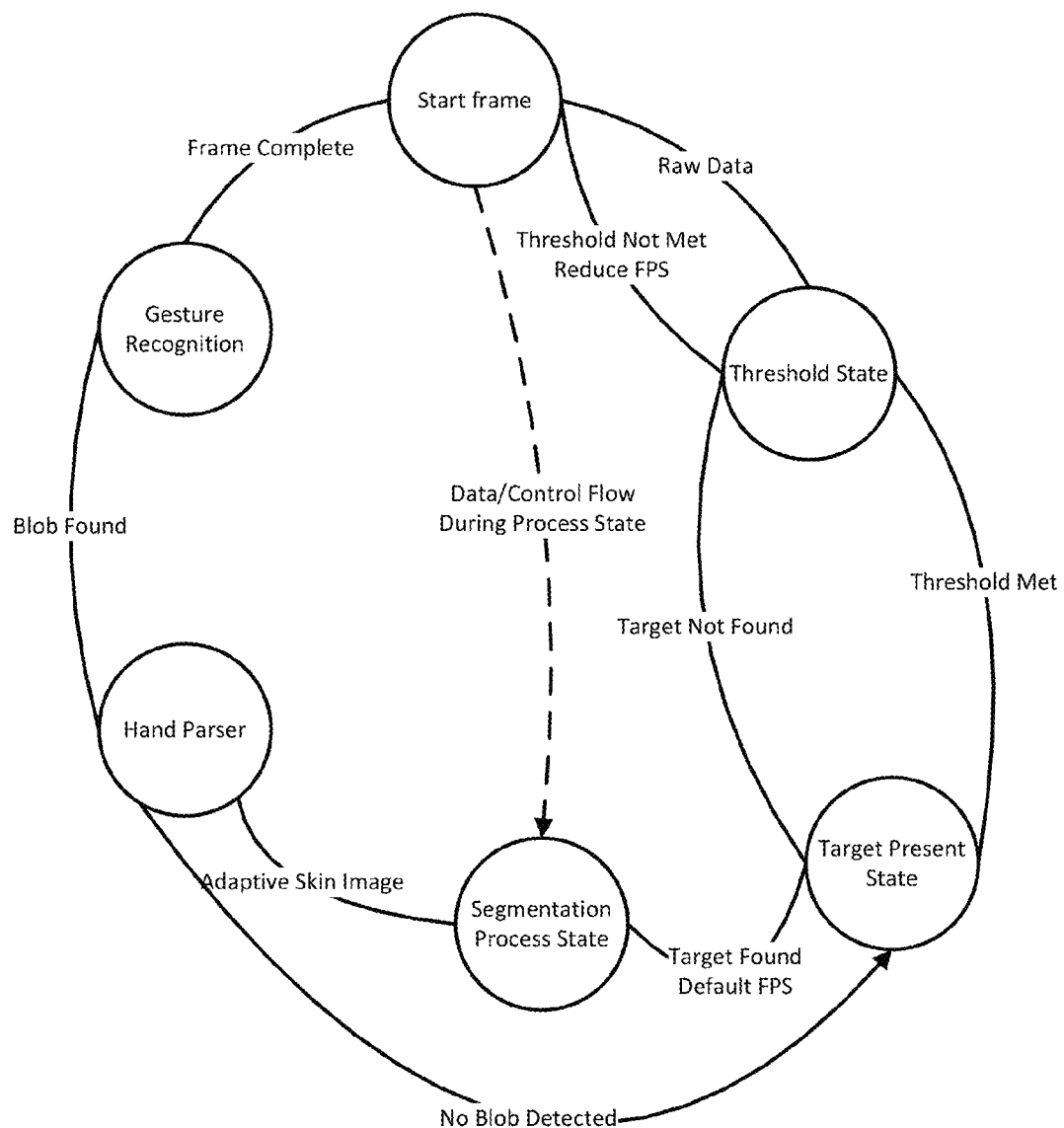
FIG. 2b illustrates control and data flow from different stages of the system shown in FIG. 2a, in accordance with an embodiment.

FIG. 2b describes control and data from the different stages of the system of FIG. 2a, in accordance with an embodiment. For the proposed partition in accordance with one example embodiment, GP-Circuitry can be configured with the Threshold Detection and Target Presence Stages, and can be further configured to control a data mux and decide whether to send the data upstream (for segmentation) to wake up the system or not. With such a send-data-on-demand approach, significant conservation of platform power can be achieved and the computing system is awake only if it needs to be awake, in accordance with some such embodiments.

As can be seen, Raw Data from a start frame is provided to the Threshold State, which is configured to detect changes in a given frame as compared to the previous frame for the region of interest. If change threshold is not met, then the FPS may be reduced and the process continues to monitor Raw Data of frames. If the threshold is met, then the Raw Data is passed along to the Target Presence State, which is configured to look for target presence within a hue range of interest, in accordance with some embodiments. Hue range can be determined, for example, using empirical data gathered by various samples. In other embodiments, the hue range can be determined as part of an initial set-up or calibration process that measures a given user's skintone. Numerous other example skintone detection processes will be apparent in light of this disclosure (e.g., FIGS. 2d and 2e). In any such cases, if a suitable target is not found, control can be provided back to the Threshold State. In some embodiments, the Threshold State and the Target Presence State can be effectively combined into one state. Otherwise, if a suitable target is found at the given frame rate (e.g., default rate or as refined within this control loop), control is passed to the Segmentation Process State, which carries out adaptive skin detection as previously explained. Also note that, as previously explained, the system may send the Raw Data directly from the camera to the Segmentation Process State, without sending it the Threshold and Target Presence States, in certain situation such as when a large enough blob is detected (as depicted in FIG. 2b and labeled Data/Control Flow During Process State), in some embodiments.

In any such cases, the Segmentation Process State is configured to carryout adaptive skintone detection to segment the image. Noises can be eliminated and image is smoothened using morphing methods, in some embodiments. The Adaptive Skin Image information is provided to the Hand Parser State, which is configured to map the blob data to human anatomical geometry, such as the model of a human hand in this example case. If the Hand Parser State cannot confirm a given blob correlates to a hand, then control is passed back to the Target Presence State (No Blob Detected). If, however, the Hand Parser State confirms a given blob correlates to a hand, then control is passed to the Gesture Recognition State (Blob Found). The Gesture Recognition State then analyzes the hand data for a particular command, such as a navigation command provided by the user. Upon concluding this analysis, the process flow is complete for that frame, and the given application executing on the computing system may then be controlled accordingly.

Figure 2C:
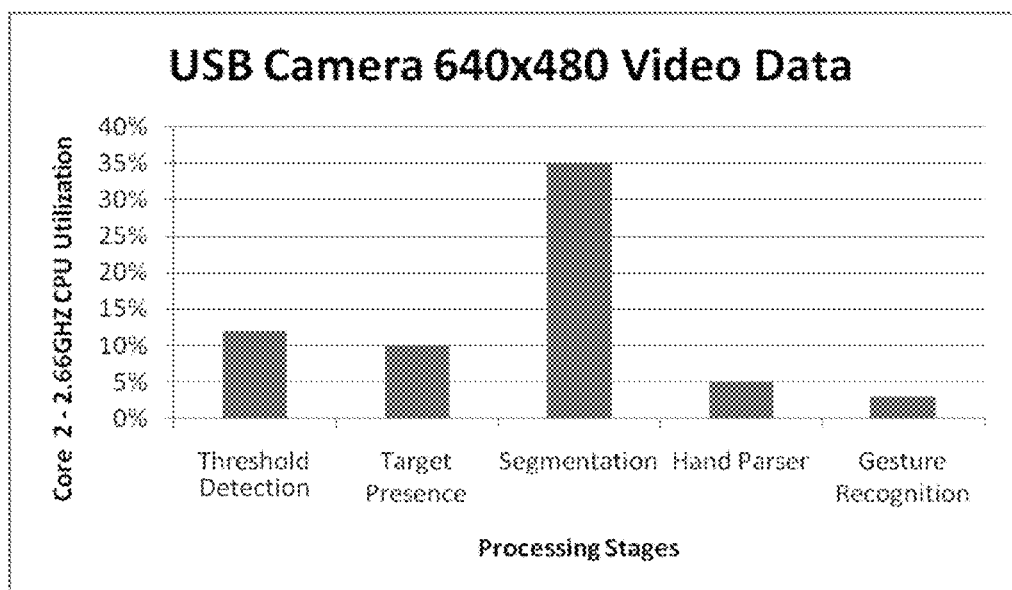
FIG. 2c shows a typical CPU utilization for each of the processes, given a particular computing system set-up, and thus demonstrates the potential for improvement that can be had by using a stepped, distributed gesture pre-processing of a video stream process, in accordance with an embodiment of the techniques disclosed herein.

FIG. 2c shows a typical CPU utilization for each of the five processes that can be implemented in the GP-Circuitry, given a particular set-up which includes a 2-2.66 GHz CPU and a USB camera that provides 640×480 pixel frames of video data. As can be seen, segmentation takes maximum utilization and with less iterative changes it is a good candidate that can be accelerated. A GPU-accelerated adaptive skintone detection algorithm would help improve the performance and power efficiency of the system overall, in accordance with an embodiment. Since the workload can be shared between CPU/GPU, this will also ensure data frames are processed without any frame drop. Typical worst case Hand Parser utilization is seen when bigger blobs are found and with longer perimeter lengths. Overall CPU utilization after the partitioning the processing as described herein (e.g., where Threshold Detection and Target Presence are distributed into or otherwise proximate the USB camera, and Segmentation is GPU-accelerated) will be less than 10%, in accordance with some example embodiments.

Simplified Skintone Threshold Detection

As will be appreciated in light of this disclosure, a number of refinements can be used to further reduce power consumption. For instance, one example embodiment allows for a simplified skintone threshold detection to reduce platform power during pre-processing at the Target Presence Stage. In general, skintone detection is usually performed in non-RGB color spaces, such as HSV, YUV, or YCbCr, and thus requires a color-space conversion between these color spaces. Human skintone detection occupies a limited range in hue, allowing for a fast, low-power, fixed-function conversion and comparison, in accordance with an embodiment. In general, if enough skintone colored pixels are found in a scanline to suggest that a finger or hand may be present, then processing can transition to the next stage, Segmentation. However, note that skintone detection at the initial thresholding phase (after disturbance is detected by Threshold Detection Stage) does not require color-space conversion or any pixel data enhancement at all. Rather, and in accordance with an embodiment, the camera sensor's raw RGB data can be run through an ADD function, thereby independently summing the R, G, and B values of the pixel stream of the desired region/pixel scanline/etc within the markered region, and the system can be further configured to detect gross differences in the summed color values (integrated) over time. For example, when a certain percentage change occurs in these summed values, indicating a change in the ratio of skintone vs. background-keyboard colors, then a threshold event has occurred and processing can transition to the next stage (Segmentation Stage). Like the previously discussed skintone detection technique using hue, this technique using RGB skintone detection requires no data storage or information from the previous video image frame, as the video stream data can be discarded after processing. A single register can be used to store the threshold value (e.g., the percentage or ratio of skintone in the scanline that must be exceeded to trigger a thresholding event). Thus, simplicity and power reduction for this threshold evaluation can be achieved by comparing skintone color values against background color values (such as the keyboard color). It is simple in the sense that it involves comparing skintone to non-skintone, instead of non-skintone to some arbitrary difference in color.

Figure 2D:
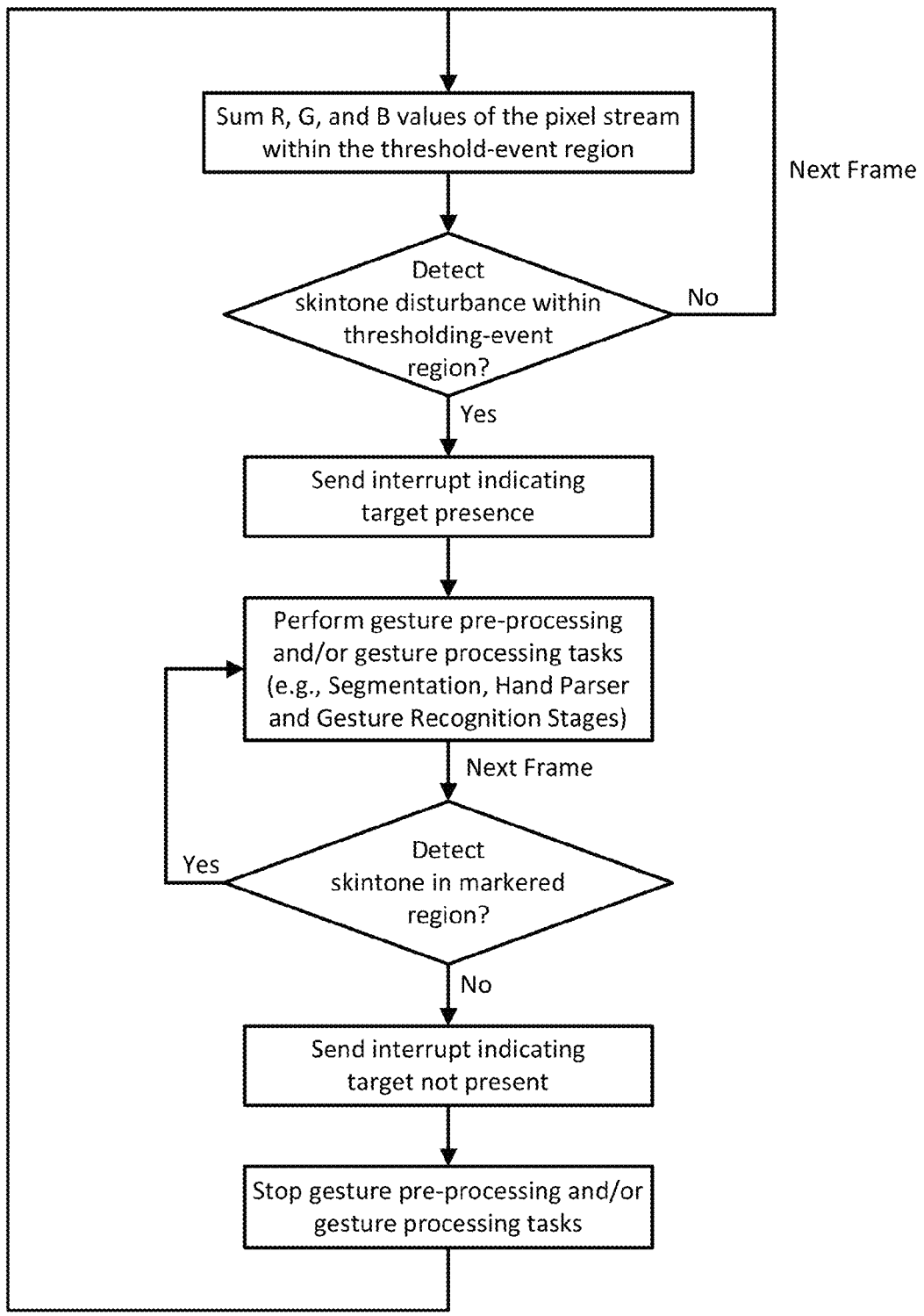
FIG. 2d show an example method for skintone threshold detection to reduce platform power, in accordance with an embodiment of the techniques disclosed herein.

FIG. 2d show an example method for skintone threshold detection to reduce platform power, in accordance with an embodiment. As will be appreciated in light of this disclosure, the power reduction can be realized as the algorithm can be readily implemented within, for example, RTL or software in the camera (or GP-Circuitry), so as to not implicate CPU process cycles. As can be seen, in this example embodiment, the thresholding of target presence is performed using skintone detection within a single pixel-scanline (e.g., across the A-GH-L keys of the keyboard), while the evaluation of the target can be performed over the full markered region (e.g., keyboard). The method includes summing the R, G, and B values of the pixel stream within the threshold-event region (e.g., scan line or partial scan line or pixel along or otherwise on the A-GH-L keys).

The method continues with determining if a skintone disturbance within the thresholding-event region has been detected (by comparing the summed R-G-B value to a given threshold). If the comparison indicates that no skintone disturbance has been detected, then the process continues to look for one within the limited pixel area of the thresholding-event region for each subsequent frame. However, if a skintone disturbance within the thresholding-event region of a given frame has been detected, then the method continues with sending an interrupt indicating target presence, and performing gesture pre-processing (which may include processing by the Segmentation, Hand Parser and Gesture Recognition Stages in some embodiments) and/or any other gesture processing tasks. For each next frame, the method includes determining if there are skintone pixels present in the markered region using hue based techniques previously discussed, and if so, continuing with processing of the frames. In response to not detecting skintone in a given frame, the method continues with sending an interrupt indicating that the target is no longer present, and stopping any further gesture pre-processing and/or gesture processing tasks. At this point, the method effectively repeats and continues to monitor the thresholding-event region of subsequent frames for a skintone disturbance by summing the R-G-B pixel values in the threshold-event region to see if a change in the ratio of skintone vs. background-keyboard colors has occurred.

Figure 2E:
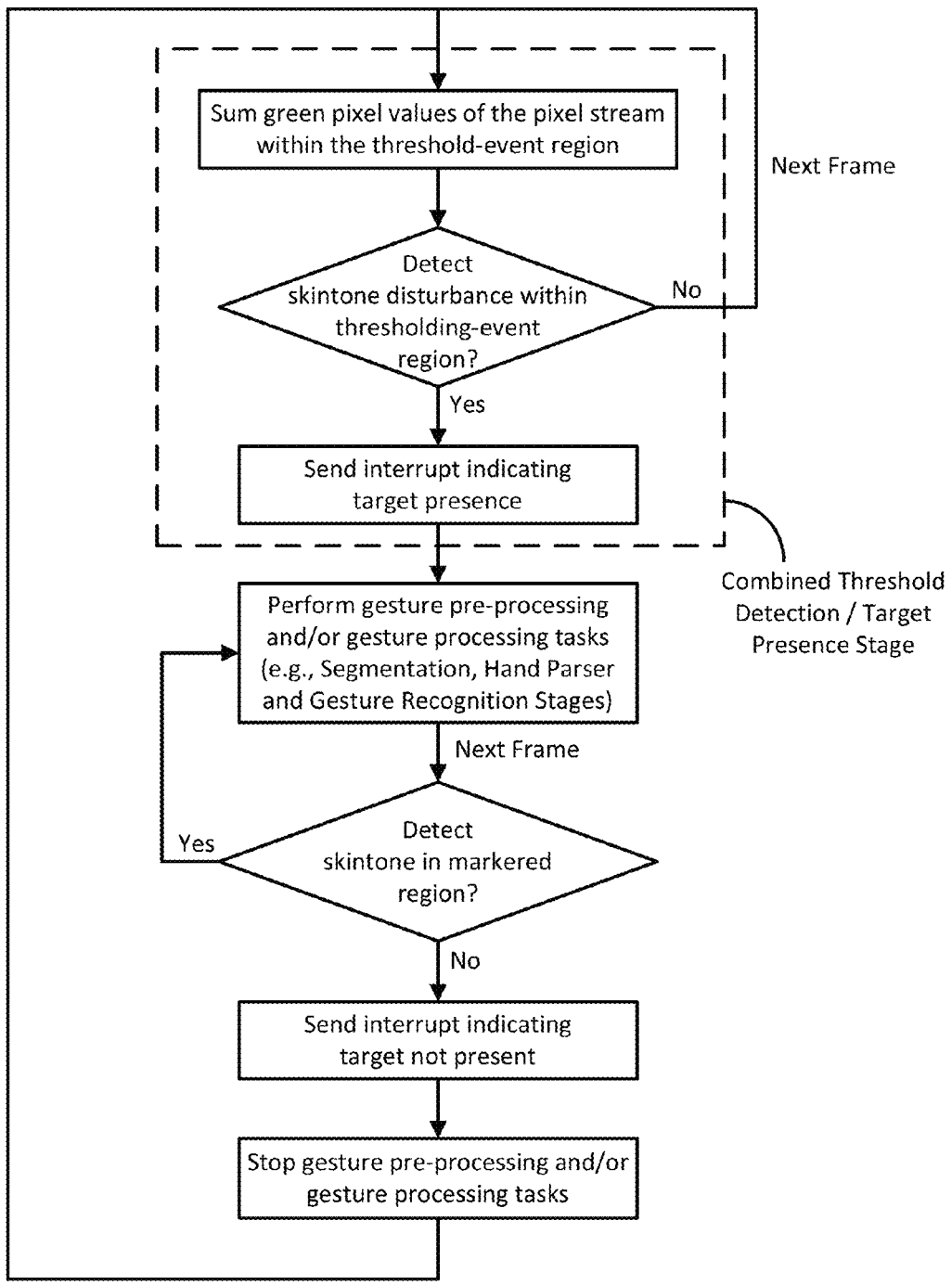
FIG. 2e show an example method for skintone threshold detection to reduce platform power, in accordance with another embodiment of the techniques disclosed herein.

FIG. 2e show an example method for skintone threshold detection to reduce platform power, in accordance with another embodiment. The power saving achieved with the RGB-based skintone detection algorithm discussed with reference to FIG. 2d can be further improved. In particular, the hue (and luma) of skintone is dominated by the color green. As such, a test of the green pixels from the scanline (or other suitable thresholding-event region) can be used to provide the same information more quickly and more power efficiently. No color-space conversion or skintone mapping/comparison is needed, and only green pixels are operated on. The color space information is therefore reduced by two-thirds (e.g., the camera can power down the red and blue pixels). As previously noted, the keyboard color can be chosen to highlight the skintone vs. keyboard color difference. Thus, a simplified skintone threshold detection can be achieved by summing raw pixel data from within a single-color (green) video stream, to reduce platform power during gesture recognition pre-processing. Note that, in some cases, the color space information can be reduced by 75%, because each pixel is typically designed with Rx1, Gx2, and Bx1 sensors, so the camera vendor can leave the Gx1 sensor operational and power down the other color sensors in the pixel, Rx1, and Bx1. Thus, in some embodiments of the techniques disclosed herein, threshold detection and skin tone detection (Threshold Detection and Target Presence Stages) can be reduced to a single summing/detection function acting upon a very low-bandwidth video stream of green pixel data from a limited set of pixels within a thresholding-event region (e.g., single/partial scanline or a single pixel). This alternate embodiment is represented in FIG. 2d, as shown by the dashed box. When skintone color is detected, the camera can power backup the unused pixels and pixel-color-sensors, so that the system may transition to the next stage or processing (e.g., Segmentation Stage). Such a rudimentary skintone detection function can be extended, for example, to provide low-power user wake events using hand gestures, in accordance with some embodiments. In one such embodiment, all other systems in the entire computer system can be powered down when in suspend/standby or other low power mode, while the extremely low-power skintone thresholding algorithm can be configured to wait for a wake event from the user's hand gesture. Given the user's temporal expectations of wake-from-standby, the camera's (or GP-Circuitry's) thresholding decisions can be made with very slow frames per second (FPS) images (e.g., 1-4 FPS, as compared to the typical 30+FPS available in camera sensors), which will reduce power even further.

As previously explained with reference to the example methodology of FIG. 2d, the methodology of FIG. 2e can also be realized as an algorithm implemented within, for example, RTL or software in the camera (or GP-Circuitry). As can be seen, in this example embodiment, the thresholding of target presence is performed using skintone detection within a single pixel-scanline (e.g., across the A-GH-L keys of the keyboard), while the evaluation of the target can be performed over the full markered region (e.g., keyboard). The method includes summing only the green pixel values of the pixel stream within the threshold-event region (e.g., scan line or partial scan line or pixel along or otherwise on the A-GH-L keys). The method continues with determining if a skintone disturbance within the thresholding-event region has been detected (by comparing the summed green pixel value to a given threshold). If the comparison indicates that no skintone disturbance has been detected, then the process continues to look for one within the limited pixel area of the thresholding-event region for each subsequent frame. However, if a skintone disturbance within the thresholding-event region of a given frame has been detected, then the method continues with sending an interrupt indicating target presence, and performing gesture pre-processing (which may include processing by the Segmentation, Hand Parser and Gesture Recognition Stages in some embodiments) and/or any other gesture processing tasks. For each next frame, the method includes determining if there are skintone pixels present in the markered region using hue based techniques previously discussed, and if so, continuing with processing of the frames. In response to not detecting skintone in a given frame, the method continues with sending an interrupt indicating that the target is no longer present, and stopping any further gesture pre-processing and/or gesture processing tasks. At this point, the method effectively repeats and continues to monitor the thresholding-event region of subsequent frames for a skintone disturbance by summing only the green pixel values (to the exclusion of red and blue pixels) in the threshold-event region to see if a change in the ratio of skintone vs. background-keyboard colors has occurred.

Example Use Cases and System Configurations

Figure 3A:
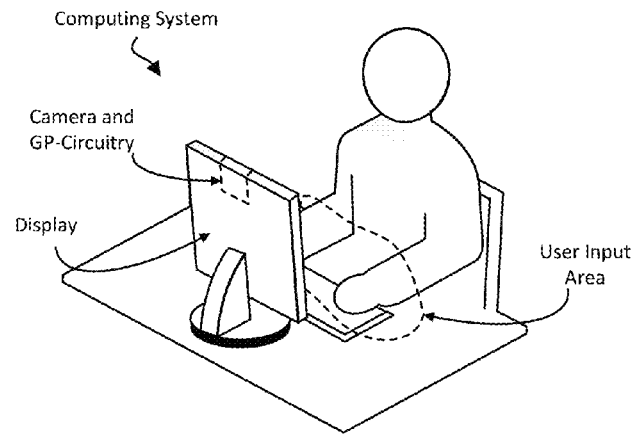
FIG. 3a illustrates an example use case of a computing system configured for carrying out stepped, distributed gesture pre-processing of a video stream to reduce platform power consumption, in accordance with an embodiment of the techniques disclosed herein.

FIG. 3a illustrates an example use case of a computing system configured for carrying out stepped, distributed gesture pre-processing of a video stream to reduce platform power consumption, in accordance with an embodiment. As can be seen, a user is sitting in front of the computing system in a common or otherwise typical fashion. The computing system of this example appears as a desktop arrangement having an external display, but may be any suitable computing system as will be appreciated, such as a laptop or netbook or other such mobile computing device using a lid-based display, or a mobile computing device using an external display, or a touch screen device such as a tablet or smartphone.

In any such cases, the system of this example embodiment is further configured with a camera and GP-Circuitry. The camera can be used, for example, to capture user gestures such as hand-gestures. In this example case depicted in FIG. 3a, the camera and GP-Circuitry are embedded within the top of the display so as to provide an FOV that includes the area where the user's hands will be active using, for example, the computer systems keyboard, mouse, touch screen, or other such input devices. Note, however, that given the gesture interpretation capability of the system as described herein, the user need not actually engage such input devices. Rather, the user can simply motion his or her hands within the designated user input area that is in the FOV so as to effectively communicate with the computer system using hand-based gestures, as discussed herein. FIGS. 3b-e illustrates various example arrangements for camera and GP-Circuitry.

Figure 3B:
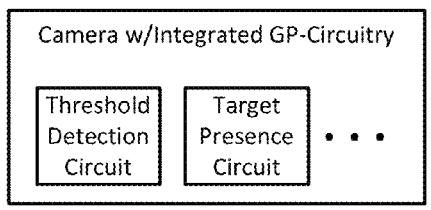
FIGS. 3b-e each illustrates an example arrangement for camera and GP-Circuitry, in accordance with an embodiment of the techniques disclosed herein.
Figure 3C:
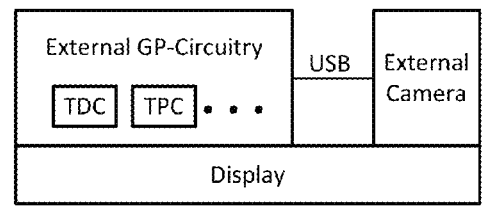
Figure 3D:
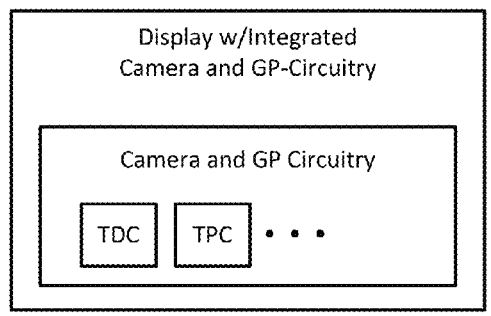
Figure 3E:
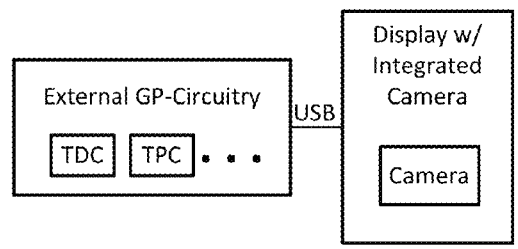

FIG. 3b illustrates the example case where the GP-Circuitry is integrated or otherwise subsumed within the camera's imaging integrated circuitry (silicon or otherwise) to further reduce platform power, by eliminating the IO power between camera sensor and at least some of the image processing functions. In this example case (as well as the example cases shown in FIGS. 3c-3e), the GP-Circuitry includes at least the Threshold Detection and Target Presence circuits, and possibly others of the gesture pre-processing circuits provided herein, if so desired. FIG. 3c illustrates another example case where the camera and the GP-Circuitry are implemented separately from one another but nonetheless proximate to one another and operatively coupled by a relatively short communication bus, which in this example embodiment is a USB bus. Any number of other suitable communication ports and bus structures can be used, as will be appreciated. FIG. 3d illustrates another example case where the GP-Circuitry is integrated or otherwise subsumed within the camera's imaging integrated circuitry, and the camera is embedded within the display. FIG. 3e illustrates another example case where the camera is embedded within the display, and the GP-Circuitry is configured as a stand-alone device that is configured to operatively couple with a USB port of the device so as to provide access to the camera embedded therein. In any such example cases as indicated in FIGS. 3a-e, the display may be, for example, an external display, a touch screen display, or a lid-based display.

Figure 4:
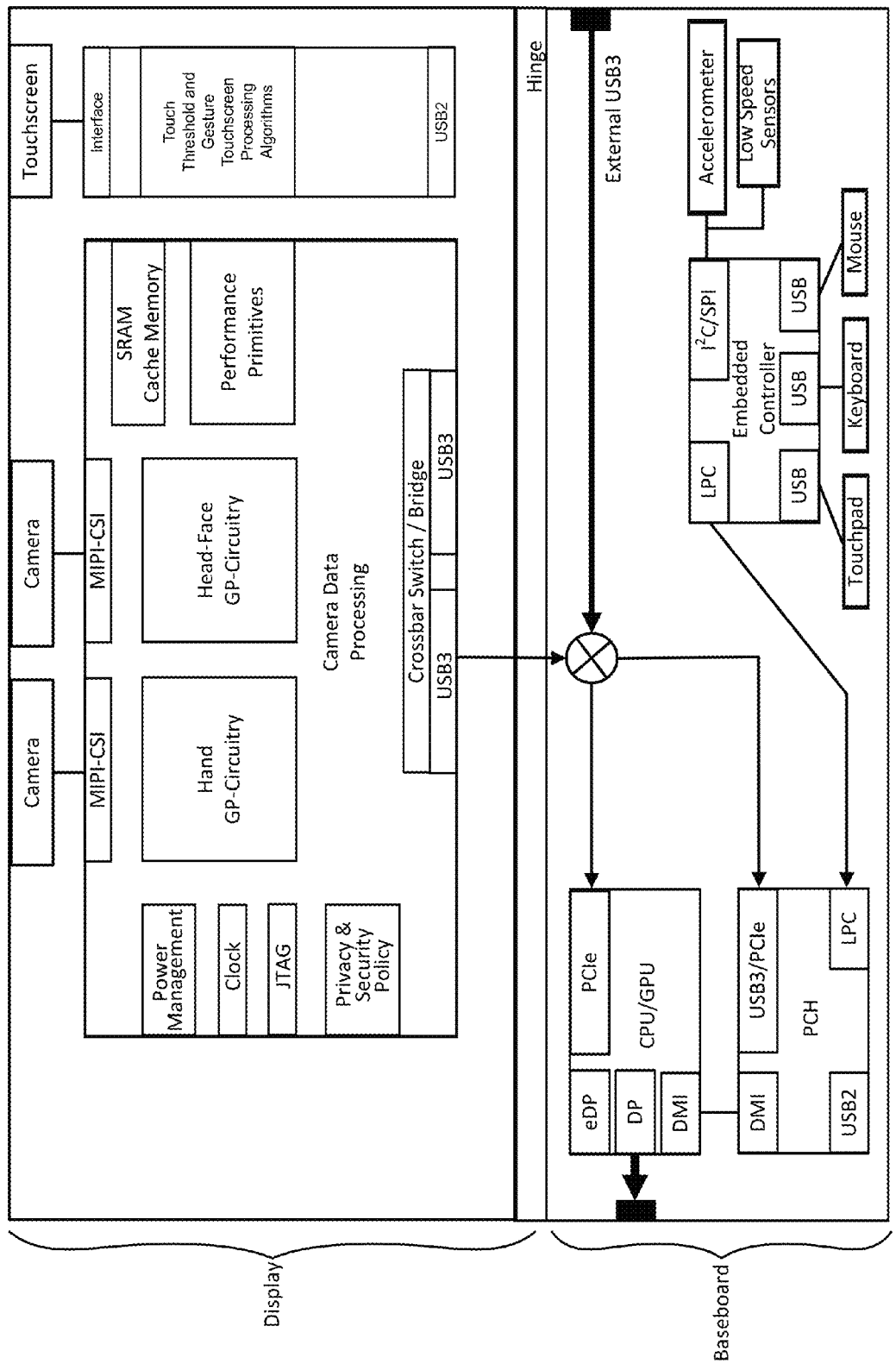
FIG. 4 illustrates a block diagram of a computing system configured for carrying out stepped, distributed gesture pre-processing of a video stream to reduce platform power consumption, in accordance with an embodiment of the techniques disclosed herein.

FIG. 4 illustrates a block diagram of a laptop computing system configured for carrying out stepped, distributed gesture pre-processing of a video stream to reduce platform power consumption, in accordance with an embodiment. As can be seen, this example has a form factor typical of a laptop and includes a baseboard portion that is operatively coupled to a display portion by a hinge. The display may have touch screen capability, but may also be an LED display, for example. In general, much of the architecture and functionality shown can be implemented with conventional or custom technology as desired, except for architecture and functionality related to staged and distributed gesture pre-processing of video content, which is implemented in accordance with an embodiment of the techniques disclosed herein and will be discussed in turn.

In this example case, the GP-Circuitry is included in the Sensor Data Processing block of the Display circuitry, which is operatively coupled to two integrated cameras via a corresponding mobile industry processor interface-camera serial interface (MIPI-CSI). One camera is focused on a first user input area so as to capture user hand gestures, and the other camera is focused on a second user input area so as to capture the user head and face gestures. As will be appreciated, the Hand GP-Circuitry is configured with Threshold Detection and Target Presence Stages for user hand gesture processing, and the Head-Face GP-Circuitry is configured with Threshold Detection and Target Presence Stages for user head and/or face gesture processing. Thus, in this example case, the GP-Circuitry can be effectively bifurcated into two gesture-specific blocks. In other example embodiments, one camera could be used in conjunction with a mechanical lensing assembly that effectively allows the single camera to capture both targeted user input areas, if so desired. In such cases, the GP-Circuitry could be implemented as a single block that is capable of processing each of the various gestures types involved.

As will be appreciated, the GP-Circuitry can be implemented for each of the hand and head-face in a similar manner. As previously explained, regardless of the anatomical target, the Threshold Detection Stage of the GP-Circuitry can be implemented with gate-level logic or other purpose-built semiconductor configured to, for example, sum and compare the luma channel for each frame, and if the delta between the current and previous frame is above a given threshold (e.g., >3% change, or >5% change, or >10% change), then a user detection signal can be generated thereby triggering passage of the Raw Data to the Target Presence stage. Otherwise, non-changing or otherwise empty frames effectively suppress such a detection signal thereby conserving power during gesture-free time. In a similar fashion, and regardless of the anatomical target, the Target Presence Stage GP-Circuitry can be implemented with gate-level logic or other purpose-built semiconductor configured to, for example, convert an RGB (or YUV) data stream scan line into an HSV pixel, and to compare pixel hue values represented therein to the relatively limited range of skintone hue. In other embodiments, the Target Presence Stage GP-Circuitry can be implemented with gate-level logic or other purpose-built semiconductor configured to sum pixel values, as previously described with reference to FIGS. 2d-e. If skin-colored pixels are found in a scan-line to suggest that a finger or face might be present, then processing transitions to the Segmentation stage. Otherwise, frames with no target present or an insufficient number of skin-colored pixels are not sent to the next stage or are otherwise suppressed, so as to conserve power during gesture-free time. In other embodiments, the Target Presence Stage may be implemented in the GPU, given the parallel nature of its function (e.g., parallel analysis of hue for each pixel within a given scan line). However, in such cases, there is generally a higher IO power cost to transmit that image data from the camera to the GPU, as will be appreciated. Nonetheless, using the GPU still avoids CPU cycles associated that would be necessary with processing of that image data at the driver level.

The Segmentation Stage in this example embodiment is co-located with the CPU, as is sometimes done, but other embodiments may utilize a separate GPU that is in communication with the CPU, as previously explained. The Segmentation Stage is configured to transform each frame of color video it receives into an image of blobs, wherein nonzero pixels represent blob pixels and black pixels indicate non-blob pixels, in accordance with one example embodiment. In such a case, blobs can be used to represent areas of skin-colored pixels, for instance. In this sense, the Segmentation Stage adapts or otherwise more clearly defines the bounds of skin hue based blobs within a given frame, thereby effectively reducing the complexity of a given image to a binary arrangement (blob and non-blob). The amenability of such a scan line based processing task to parallel processing makes the Segmentation Stage an ideal candidate for GPU implementation.

In other embodiments, the Segmentation Stage may be implemented in the GP-Circuitry with gate-level logic or other purpose-built semiconductor, in a similar fashion to the Target Presence Stage. However, defining the bounds of blob data may generally require a greater number of scan lines to be processed, which may increase the complexity of the Target Presence Stage. However, this complexity can be offset, for example, by using assumptions appropriate for the target anatomical feature and a reasonable degree of interpolation. For example, assume a hand making a peace sign is the target anatomical feature, and that three or four scan lines of a hand image are processed. The first scan line may show, for example, alternating groups of non-skintone pixels (three groups) and skintone pixels (two groups) taken across the upper part of the 'V' portion of the peace sign. The second scan line may similarly show alternating groups of non-skintone pixels (three groups) and skintone pixels (two groups) taken across the lower part of the 'V' portion of the peace sign, but the length of the non-skintone pixel portion between the two skintone pixel portions will be shorter. The third scan line may show alternating groups of non-skintone pixels (two groups) and skintone pixels (one group) taken across the body portion of the hand, and the fourth scan line may show alternating groups of non-skintone pixels (two groups) and skintone pixels (one group) taken across the wrist portion, wherein the group of skintone pixels in the body portion of the hand is longer than the group of skintone pixels in the wrist area. Thus, if such characterizations of these three or four scan lines can be confirmed using logic-based comparisons, for example, then hand data associated with the intervening scan lines can be interpolated or otherwise estimated and the bounds of the overall skintone blob can be assigned accordingly. As will be appreciated, similar processing can be used to detect fully enclosed ovoids and partially enclosed ovoids such as those shown in the example hand gestures of FIGS. 10a-c and 11a-f (fully enclosed) and 10d-f (partially enclosed). In some such embodiments, and as will be discussed with respect to FIGS. 9a-b, the image processing can be constrained to a markered region such as the user's keyboard (FIG. 9a) or mouse pad (FIG. 9b) over which such hand gestures are likely to take place in a computer/Internet navigation scenario, wherein the one or more scan lines processed by the Target Presence Stage to define the bounds of blob data can be set at the thresholding-even region that passes laterally through the middle of the keyboard.

The Hand Parser and Gesture Recognition Stages can be executed by the CPU in the baseboard as part of the application driver, but only if activated by the earlier stages as described herein. Again, such processing may alternatively be performed in the GPU, or even in the GP-Circuitry, in accordance with some embodiments. To this end, the degree of integration of the pre-processing functions into the GPU and/or GP-Circuitry can be based on, for example, a cost benefit analysis that balances (on one hand) the expense/cost of such integration with (on the other hand) the savings in power consumption and CPU cycles. As will be appreciated in light of this disclosure, a significant savings at a relatively low cost can be realized by implementing the Threshold Detection and Target Presence Stages in the GP-Circuitry, the Segmentation Stage in the GPU, and allowing the Hand Parser and Gesture Recognition Stages to execute on the CPU. The cost of further integration into the GP-Circuitry may not be justified or otherwise desirable, but the present disclosure is not intended to be so limited.

With further reference to FIG. 4, the SRAM Cache Memory can be used to store parameters associated with efficient processing of video, and may be implemented with any other type of suitable memory technology. For example, in some embodiments, the Memory may be used for storing coordinates within a frame that typically include the hand gestures provided by a user. These coordinates can be established and/or refined overtime based on, for instance, empirical analysis or may be user-configured. These coordinates may also be periodically refined or otherwise updated based on, for instance, a change in the relative position of the markered region within the camera's FOV. In any case, such coordinates can be used by the GP-Circuitry (and other components, if so desired) to effectively further reduce the image processing load. In this sense, a subset of the video stream can be analyzed. The Memory may also include the range of skintone associated with a particular user set-up. This data can be established overtime based on, for instance, empirical analysis or may be user-configured. Numerous other types of information and data can be stored in the Memory, as will be appreciated.

The Performance Primitives are optional components that can be provided to support functions of the GP-Circuitry, and may be implemented in hardware and/or software. Example performance primitives suitable for processing hand-gesture video might be, for instance, matrix multiplication or summing modules. Another example function might be a Fourier transform module to convert an image from the spatial domain to the frequency domain, to facilitate processing. In a more general sense, any image processing tools that would be used by the CPU-based driver processing could be implemented in the Performance Primitives to assist in the distributed pre-processing functions. The optional Privacy & Security Policy module can be configured to provide protection against malicious behavior, and may be implemented to enforce one or more security policies, such as those associated with a trusted device processing environment. For instance, the Privacy & Security Policy module may enforce policies such as user-based policies (e.g., some users may not want the camera turned on) and platform-based policies (e.g., only trusted platform module (TPM) devices can connect to the platform controller hub (PCH), via the USB port).

Figure 5:
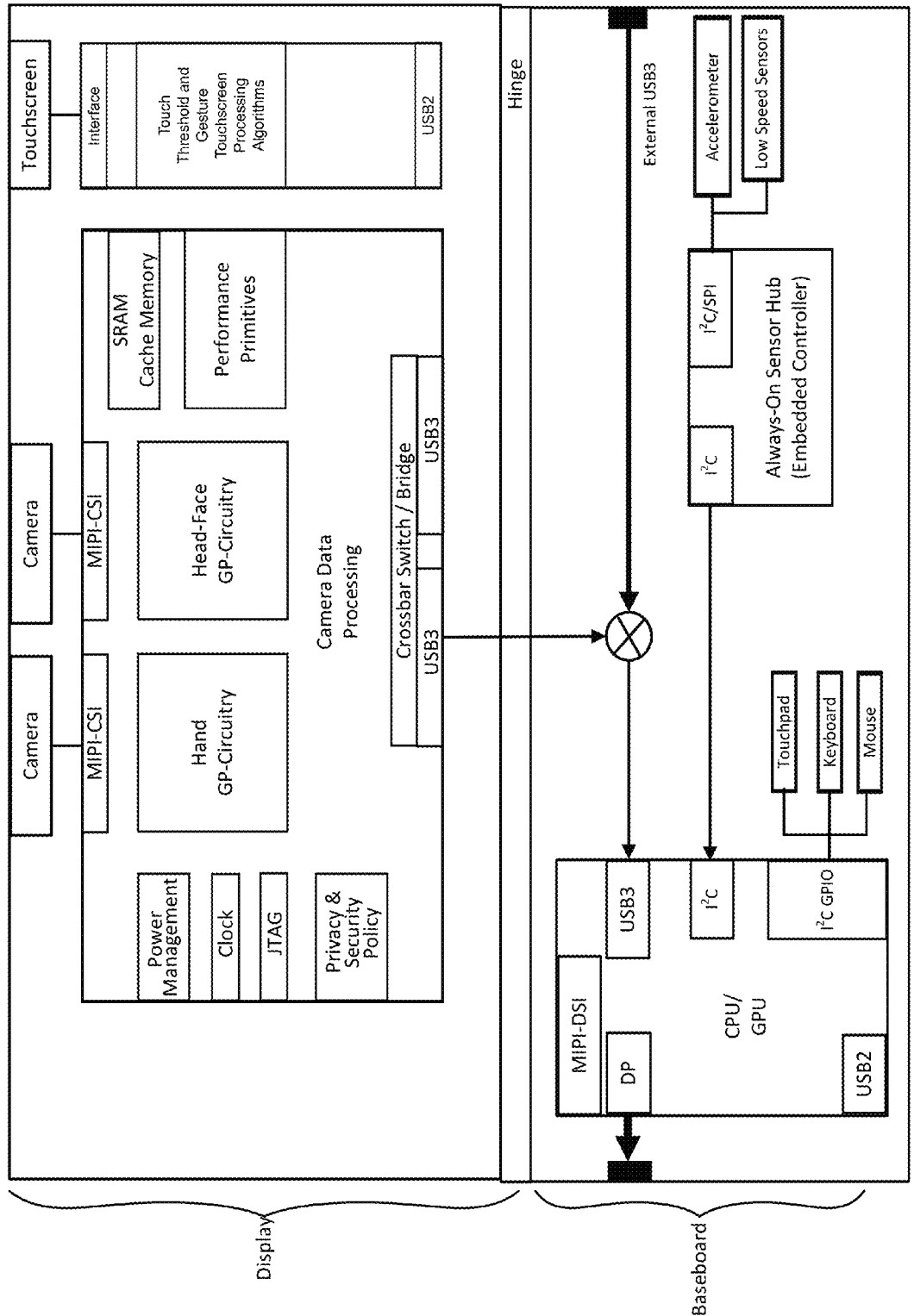
FIG. 5 illustrates a block diagram of a computing system configured for carrying out stepped, distributed gesture pre-processing of a video stream to reduce platform power consumption, in accordance with another embodiment of the techniques disclosed herein.

The other display and baseboard componentry shown in FIG. 4 may be implemented as typically done or as otherwise desired. FIG. 5 illustrates a block diagram of a netbook computing system configured for carrying out stepped, distributed gesture pre-processing of a video stream to reduce platform power consumption, in accordance with another embodiment. As can be seen, the display portion of the system is similar to the display portion of the laptop system shown in FIG. 4, and the previous relevant discussion is equally applicable here. The baseboard section is similar as well, but is configured somewhat differently given that it is a netbook configuration. Thus, the CPU might be, for example, an Intel®Atom™ CPU or other such processor suitable for netbooks, nettops and other such low power miniature computing systems. The GPU may be co-located with the CPU as shown or otherwise operatively coupled with the CPU, as previously explained.

Figure 6:
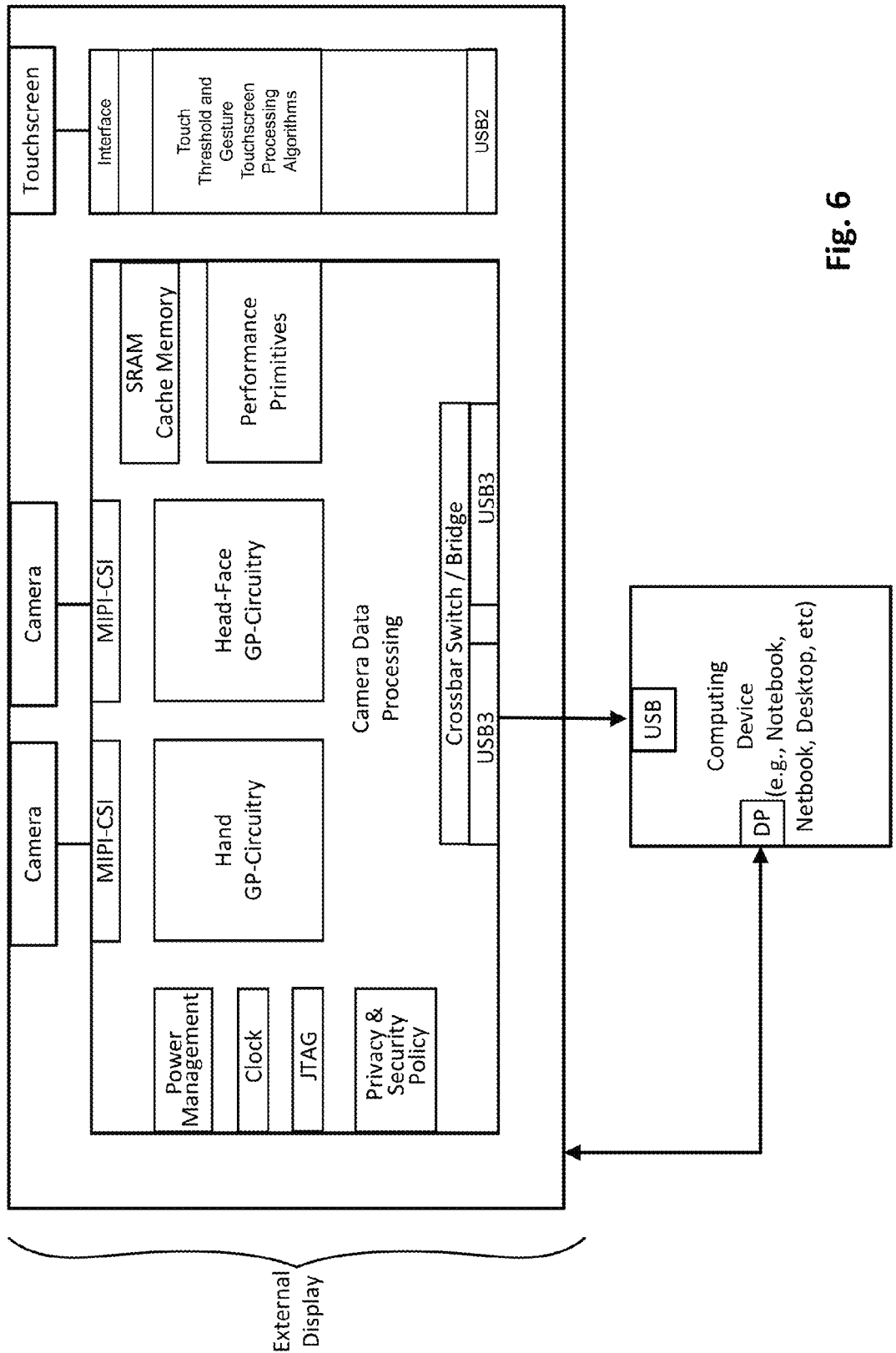
FIG. 6 illustrates a block diagram of a computing system configured for carrying out stepped, distributed gesture pre-processing of a video stream to reduce platform power consumption, in accordance with another embodiment of the techniques disclosed herein.

FIG. 6 illustrates a block diagram of a computing system having an external display and configured for carrying out stepped, distributed gesture pre-processing of a video stream to reduce platform power consumption, in accordance with another embodiment. The computing system may be, for example, a desktop or laptop (docked or undocked running on battery power). As can be seen, the display and baseboard portions of the system can be similar to the display/baseboard portions of the systems shown in FIGS. 4 and 5, and the previous relevant discussion is equally applicable here. Numerous other computing system architectures and configurations can be used, and the present disclosure is not intended to be limited to any particular one.

Figure 7:
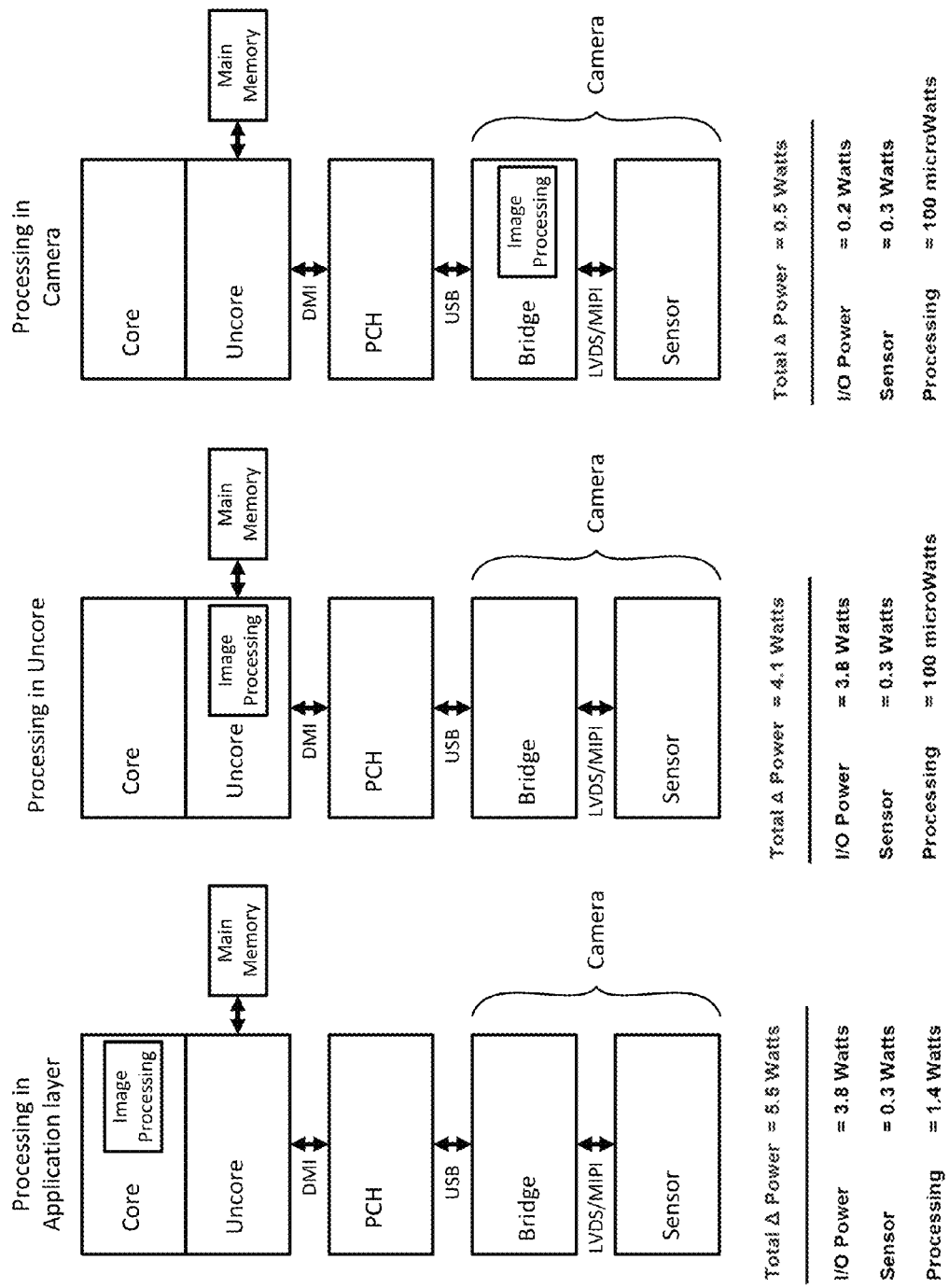
FIG. 7 illustrates an example of how much platform power consumption can be reduced, in accordance with an embodiment of the techniques disclosed herein.

FIG. 7 indicates power savings achieved by moving the video pre-processing out of the Core/Uncore and into the camera module, in accordance with an embodiment. The Total Δ Power is the power consumed above the platform's standby power. As will be appreciated in light of this disclosure, CPU C0%-occupancy for video operation can be substantially reduced when nothing is present in the image. As can be further seen, while moving the image processing from the Core to the Uncore saves about 1.4 Watts of power (from reduced CPU cycles), an additional power savings of about 3.6 Watts is achieved when pre-processing (such as Threshold Detection and Target Presence states) is performed within the camera sensor itself, thereby eliminating I/O power.

Example hand gestures that can be used for Internet navigation generally rely on coarse-grain gestures (e.g., scroll up/down, next/previous page, double-click, etc), with a single fine-grain gesture typically used for mouse movement, for instance. Typing on the keyboard was only required when entering specific textual information. Typical classes of text include URLs, user names, passwords, search words (including street names, etc). In many scenarios, little or no mouse movement is required. Thus, the simplicity of the gestures further allows gesture recognition to be implemented as a distributed process within the camera itself.

Gesture API

Figure 8:
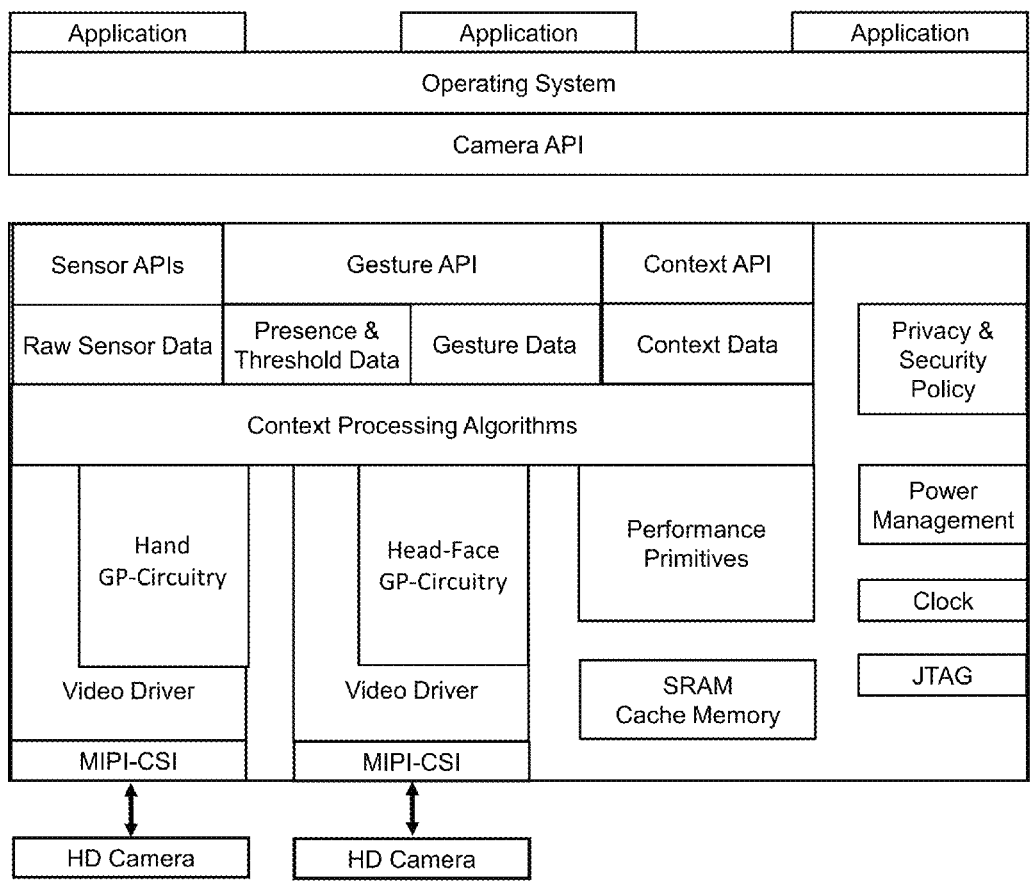
FIG. 8 illustrates a block diagram of an application programming interface (API) configured for carrying out stepped, distributed gesture pre-processing of a video stream to reduce platform power consumption, in accordance with another embodiment of the techniques disclosed herein.

FIG. 8 illustrates a block diagram showing an application programming interface (API) configured for carrying out stepped, distributed gesture pre-processing of a video stream to reduce platform power consumption, in accordance with another embodiment of the techniques disclosed herein. In this example case, the Gesture API is one or many APIs available on this particular system (Sensor APIs, Context API). Raw Sensor Data is processed through the Sensor API(s), and the Gesture API pre-processes Raw Sensor Data and exposes information from the Threshold Detection and Target Presence stages (Presence & Threshold Data), as well as the Segmentation, Hand Parser, and/or Gesture Recognition stages (Gesture Data), regardless of whether the computation was performed within/near the camera sensor or within the software driver running on the CPU/main memory. As can be further seen, the Gesture API may include Privacy & Security policies such as user-based policies (e.g., some users may not want the camera turned on) and platform-based policies (e.g., only trusted platform module (TPM) devices can connect to the platform controller hub (PCH), via the USB port). As previously explained, the Gesture API pre-processes raw video data and presents as an extended USB HID class device. In such cases, Raw Data is unaffected and presents as a standard USB video class device.

The Gesture API can be programmed or otherwise configured to communicate status messages to a gesture device endpoint in the camera, such as the pixels comprising the user input area (e.g., keyboard/mouse region, as shown in FIG. 3*a*). A procedure for an external display's camera is the same as for the notebook's integrated display's camera. In one example case, the procedure includes: locate keyboard in video stream's FOV; communicate keyboard information to the camera/GP-Circuitry, in form of pixels of interest (virtual markers); commence hand gesture pre-processing tasks in the camera sensor/GP-Circuitry; update keyboard location as needed; and present gesture processing information to platform via the Gesture API. In a multi-display or multi-keyboard system, the user can indicate which display or keyboard is primary. Any number of suitable options can be used here.

As also previously explained, the hand gestures interpreted by the Gesture API can be used to augment other complementary input modalities, such as user input received by a keyboard and/or mouse. Various search engines currently incorporate a numerous mouse/touch gestures which the user can use as shortcuts to improve their browsing experience. The user can enable/disable specific shortcuts, and add new custom shortcuts as desired. One drawback (beyond the lack of standardization) for such system is that all the shortcuts collectively add up to a potentially overwhelming number of gestures to be used, causing mental confusion in inevitably inhibit widespread adoption. In accordance with one embodiment, a relatively simple and concise list of the gesture-based commands is provided, which can be modified/expanded as desired. Some programmability may desired, as the most diligent users may wish to extend the list of gestures, and most users may like to add personalized gestures for websites listed in their Favorites, for instance. Most users typically frequent the same web pages over and over again (e.g., Google, Gmail, Facebook, etc). Reducing this series of keyboard/mouse commands to a single gesture (or short series of gestures) may improve ease-of-use and speed up the user's page-switching time.

In addition, consideration may be given to the "neutral return" required by several hand gestures. The "neutral position" is the statistically average location of the hand when not performing a hand gesture. For example, resting the palms on the palm rest, with the finger placed on the following keys: Q-E-R-G-spacebar-spacebar-H-U-I-P. The neutral return is the return of the hand to the neutral position (e.g., after performing one hand gesture and before commencing the next gesture). In most computing system usage models, the hands are maintained in the neutral position. It is desirable to minimize gross hand gestures, leaving the palms in the same physical location during the hand gestures. This simplifies the image processing because the image processing algorithms will ignore all visual activity outside of the camera's FOV.

Other components and features shown in FIG. 8 were previously discussed with respect to FIGS. 4-6 or can otherwise be implemented as typically done, as will be appreciated in light of this disclosure.

Markered Region for Fine-Grain Gesture Recognition in 2D

As previously explained, the Gesture Recognition stage can be configured to perform temporal interpretation of the anatomy/hand data generated by the Hand Parser stage. For example, if the Gesture Recognition stage is used for detecting mouse-equivalent operations, it may look for location changes of the fingertips and/or hand of the user. In some embodiments, hand gesture recognition can be carried out using a technique for creating virtual markers within a video stream's FOV to reduce platform power during pre-processing of gestures. In one such embodiment, a markered region includes, or is otherwise aligned with, the user's keyboard within the video stream's image. The image processing and intra-computer-system communication of pixel information which lies outside the markered region can be eliminated, so as to reduce processing load. In still further embodiments, the number of pixels evaluated may be reduced to a subset of this markered region, which may be, for example, as small as a pixel-scanline, partial-pixel-scanline, or a single pixel.

To this end, and as previously explained, with reference to the Threshold Detection and Target Presence Stages, FIG. 9*a* illustrates an example keyboard-based markered region within the field of view a hand gesture video processing system that can be used to control a computer system, in accordance with an embodiment. As can be seen, the markered region within the camera's video image is indicated by a solid line that generally corresponds to the perimeter of the user's keyboard, and a thresholding-event region within this markered region (dashed line running horizontally through central area of keyboard, generally corresponding to the A-GH-L keys). One or more passes (e.g., scan line or partial scanline or even a pixel) in this thresholding-event region can be made in making the initial assessments by the Threshold Detection and Target Presence Stages. Pixels outside the target markered region can be ignored, and in some embodiments, pixels outside the thresholding-event region can be ignored during these initial stages. As will be appreciated, the thresholding-event region may be located in other areas within the markered region, such as near the space bar of the keyboard, since it is it is not very likely that the user's hands will break the plane of the markered region from the topmost pixels (e.g., function keys). While an external keyboard unit is shown, other embodiments can be used with an integrated keyboard such as that associated with a laptop or notebook computer, or a tablet computer that is configured to dock or otherwise be used with a physical external keyboard. As previously explained, the position of a user's hands relative to a computing system's keyboard is a good indication of computer usage activity, and gesturing from this area is an intuitive process for the user.

Once enabled (e.g., after the Threshold Detection Stage determines if a current frame of the video stream is sufficiently different from a previous frame of the video stream and the Target Presence Stage determines the current frame includes skintone colored pixels), the subsequent image processing stages can readily identify the markered region of the keyboard and search for hands within this region. The Thresholding event can be determined by the presence of a hand within the markered region within the camera's observed image, and this event can be defined by, for example, a sufficiently large visual disturbance occurring within the markered region (or within the thresholding-event region). Activity reflected in the images that is outside the markered region (including false indicators that might be misinterpreted as gesturing) is ignored. For instance, and in accordance with some embodiments, the display and keyboard tend to be in fixed positions relative to each other over long periods of time (this is particularly true for a laptop or notebook arrangement, but may also apply to a desktop setup having an external keyboard), so the keyboard-marker's relative position in the camera sensor's visual image will also tend to be relatively fixed. Thus, the image processing can download the specific pixels of interest (such as those pixels corresponding to the markered region or a subset of the markered regions such as those pixels corresponding to the thresholding-event region) to the image pre-processing sub-system within the camera sensor (or in the GP-Circuitry as otherwise variously described herein), and the camera sensor may power down the other pixels outside this target markered region to save power, in accordance with some embodiments. Similarly, when communicating pixels to the CPU for the gesture recognition tasks (Hand Parser and Gesture Recognition Stages), the pixel information outside this markered region is irrelevant and doesn't require transfer to the CPU, further saving power. Note that is not necessary to use physical "markers" on the keyboard because keyboards are typically fabricated with a very consistent industrial design across all vendors, cultures, age groups, and can be readily distinguished from a human hand. For instance, keyboards are typically monochromatic which simplifies the task of skintone detection, as they are (or otherwise can be) made to be highly differentiated from skintone color.

In some embodiments using a keyboard-based markered region, the markered keyboard region will require periodic updates passed to the GP-Circuitry (e.g., camera sensor) because the relative positions of the display-keyboard may change (based on user activity, movement of laptop lid angle, movement of external keyboard, etc) which consequently modifies the desired pixel region in the camera's FOV image, thereby modifying the keyboard marker location within the image. Video graphics array (VGA) technology provides sufficient pixel resolution for most forms of image processing for gesture recognition. Though high-definition cameras are becoming more standard on platforms, the extra image resolution is not necessary for monitoring hand gestures, as will be appreciated in light of this disclosure. Rather, and in accordance with an embodiment of the techniques disclosed herein, by windowing a target markered region of interest, the gesture image processing system can be configured to power the minimum number of pixels to accurately capture the hand gestures, while any extra pixels required for the higher definition image resolution can be powered down to save power consumption of the IO and computational tasks.

Thus, power consumption can be significantly reduced by making judgments about how the user's hand will interact with the markered region. To this end, a goal according to one embodiment is to reduce the number of pixels being evaluated to a minimum at each stage of pre-processing, to preserve battery life. Other judgments may be made about which pixels are appropriate to evaluate, for example, while evaluating a thresholding-event region that includes, for example, a single spacebar-aligned scanline of pixels. For instance, in some such cases, it is unlikely that the user's hands will break the plane over the spacebar itself, due to the user's physical anthropometry which places the two hands either side of the spacebar. In a more general sense, making judgments about user interaction with the markered region and the thresholding-event region may reduce the number of pixels evaluated to a subset of the markered region, which may be a small as a pixel-scanline, partial-pixel-scanline, or single pixel. When a thresholding event occurs, the Threshold Detection Stage may report the event to the system and/or may pass control to the next stage of the image processing stage (skintone detection by the Target Presence Stage). In a similar fashion, when a skintone detection occurs, the Target Presence Stage may report the event to the system and/or may pass control to the next stage of the image processing stage (adaptive skintone detection by the Segmentation Stage).

Note that the system may use multiple marker definitions during operation, in accordance with some embodiments. For instance, the markered region for thresholding and/or target presence detection may be smaller than the markered region for blob recognition or for hand-gesture recognition. In some example cases, the markered region may include the keyboard and the keyboard's palm rest. However, to initiate a hand gesture (i.e., for a thresholding event to occur), the hand must break the horizontal plane aligned above the axis of the A-GH-L keys, as shown in FIG. 9a.

In another example embodiment, the markered region can be a mouse pad or a designated desk area, as shown in FIG. 9b. Other such markered regions will be apparent in light of this disclosure, such as other input devices (e.g., trackpad, touchscreen) or designated area. In still other embodiments, the markered region can be designated internally wherein the system is configured to automatically exclude a perimeter region of the FOV. In some such embodiments, the thickness excluded FOV perimeter is user-configurable. In this way, the user can effectively calibrate his/her system to a desired user set-up. As will be further appreciated in light of this disclosure, use of such markered and thresholding-event regions can be used to assist in carrying out techniques for low-cost, low-power, fine-grain-gesture recognition for computer or Internet navigation using a single 2D camera and skintone detection algorithm, in accordance with an embodiment. In some embodiments, the techniques may be extended to enable 3D object manipulation.

Methodology for Markered Thresholding of Target Presence

Figure 9C:
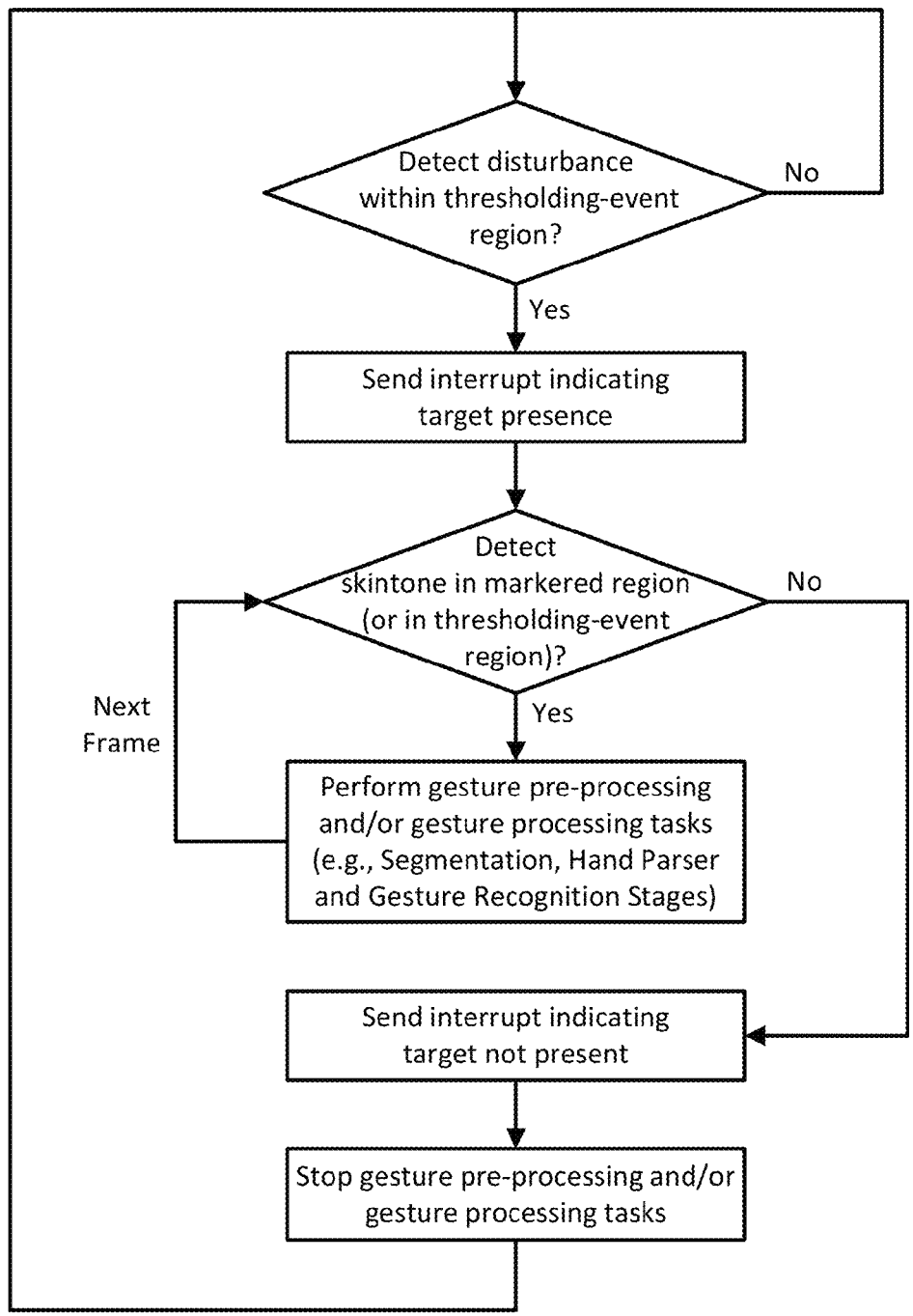
FIG. 9c illustrates a method markered thresholding of target presence in accordance with an embodiment of the techniques disclosed herein.

FIG. 9c illustrates a method markered thresholding of target presence in accordance with an embodiment. This method may be implemented in hardware or software or a combination thereof, and in one example embodiment is carried out by the five pre-processing stages, which may be executed in a stepped and distributed fashion as described herein. The markered region can be, for example, the user's keyboard and the thresholding-event region can be across a portion of that keyboard. In one specific example embodiment, the thresholding of target presence is performed using a pixel-scanline across the A-GH-L keys (thresholding-event region), while the subsequent evaluation of the target is performed over the full markered region. However, numerous variations and embodiments will be apparent in light of this disclosure, and the markered analysis techniques provided herein can be implemented in any suitable manner.

The method includes determining if a disturbance within the thresholding-event region has been detected. If not, then the process continues to look for one within the limited pixel area of the thresholding-event region of each subsequent frame. However, if a disturbance within the thresholding-event region has been detected in a given frame, then the method continues with sending an interrupt indicating target presence, so that processing can be passed to the next stage, which in this example case involves skintone detection. In particular, the method continues with determining if skintone has been detected in the markered region or in thresholding-event region, depending on the stage of processing. For instance, in one example case, if processing has just passed from the Threshold Detection Stage to the Target Presence Stage then only pixels within the thresholding-event region are analyzed for skintone, and if processing subsequent frames after the Target Presence Stage signals presence of a user then the entire markered regions can be scanned for skintone pixels.

In either such case, if it is determined that no skintone pixels are present in the targeted markered region, then the method continues with sending an interrupt indicating that the target is not present, and stopping any further gesture pre-processing and/or gesture processing tasks. At this point, the method effectively resets and continues to monitor the thresholding-event region of subsequent frames for a disturbance as previously explained. However, if it is determined that skintone pixels are present in the subset of markered region, the method continues with performing gesture pre-processing, which may include processing by the Segmentation, Hand Parser and Gesture Recognition Stages in some embodiments, and/or any other gesture processing tasks.

For each subsequent frame, the entire markered region is evaluated for skintone pixels and gesture pre-processing/processing continues for each frame until it is determined that no skintone pixels are present in the markered region. At such a point, the method continues with sending an interrupt indicating that the target is not present and stopping any further gesture pre-processing and/or gesture processing tasks, and then continues to monitor the thresholding-event region of subsequent frames for a disturbance as previously explained. The process may repeat, as needed.

Fine-Grain Ovoid-based Hand Gestures

Figure 10A:
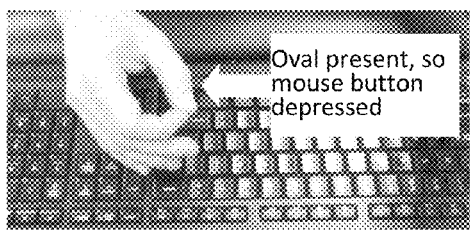
FIG. 10a-f illustrate example hand gestures that can be used in controlling a computer system, in accordance with an embodiment of the techniques disclosed herein.
Figure 10D:
Figure 10B:

As previously explained, relatively simple hand gestures can be used for computer or Internet navigation and have only a single fine-grain gesture requirement, which is to mimic mouse movement and activity. Any number of suitable gestures can be used to simulate mouse button presses and releases, which are often used in navigation. For example, and in accordance with an embodiment, one hand gesture that can be used to indicate a mouse button press involves forming an oval with thumb and index finger, as shown in FIG. 10a. As can be seen, the oval of keyboard color is recognizable between the user's thumb and index finger. The oval, which can be detected by a video gesture processing system having a keyboard-based markered FOV, can be used as an indication that the mouse button is being held down. When the oval is broken (by separating thumb and index finger), the indication is that the mouse button is released, in accordance with an embodiment, as shown in FIG. 10b.

With these two simple hand gestures, the image processing algorithms (such as those at the Gesture Recognition stage) can be programmed or otherwise configured to detect skintone shapes when evaluated against the non-skintone keyboard-background color. For instance, for the period that the mouse button is held down (the oval is present), the gesture processing executed by the Gesture Recognition stage can be configured to track the X-Y movements of the oval, using the oval's centroid to determine X-Y cursor movement thereby mimicking the cursor movement of the mouse. In such an example case, the X-Y axes can be defined within the visual image by the X-Y axes of the keyboard. In one specific example embodiment, skintone/non-skintone edge detection of +/−1.5 pixels was used, and was found to be, sufficient to accurately track the Oval's centroid along the X-Y axes as described herein. Other embodiments may be configured differently, depending on desired accuracy as will be appreciated in light of this disclosure.

Figure 10E:
Figure 10C:
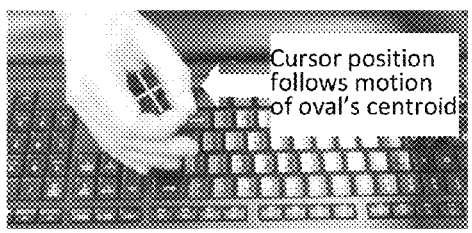
Figure 10F:
Figure 11A:
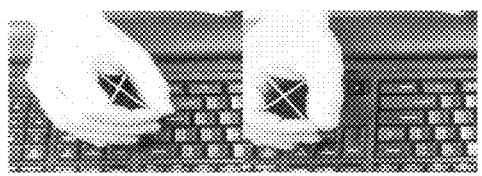
FIG. 11a-f illustrates how a given hand gesture with the within the field of view a hand gesture video processing system can be analyzed for movement in six axes of motion, in accordance with an embodiment of the techniques disclosed herein.
Figure 11D:
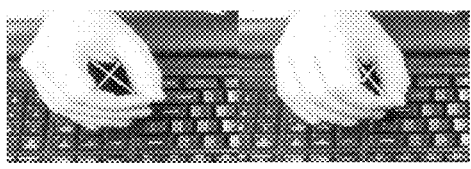
Figure 11B:
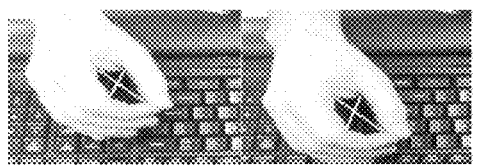
Figure 11E:
Figure 11C:
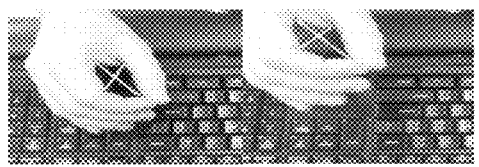
Figure 11F:

Another mouse function that can be used is mouse double-clicking, which can be recognized as a quick incremental separation of the thumb from the other four fingers, extending slightly beyond the neutral position of the thumb+fingers. In particular, this mouse double click gesture can be carried out as shown in FIGS. 10d-f, where the initial neutral position is shown in FIG. 10d, followed by a quick incremental separation of the thumb from the other four fingers as shown in FIG. 10e, followed by return back to the neutral position is shown in FIG. 10f, with a 1 to 2 second delay in transitioning from the initial neutral position to the separated position, and then another a 1 to 2 second delay in transitioning from the separated position back to the initial neutral position. These specific examples allow for maintaining the location of the near-complete ovoid (sometimes called partially enclosed ovoid herein) relative to the center of the hand-blob. Other suitable hand gestures are possible, as will be appreciated in light of this disclosure.

Extension to 3D Object Manipulation

Much of the currently available gesture recognition technology is focused on 3D Z-Depth cameras driven by the belief that such solutions provide better spatial resolution of objects placed within the camera's FOV. However, this requires huge amounts of computational power, and this consumes battery power. In addition, there are a number of solutions available which attempt to map the 2D camera images onto articulated hand models, and then perceive gesture by interpreting the relative motion of the articulated joints of the hand model. But these solutions can be fairly complex.

Thus, and in accordance with an embodiment, the ovoid-based techniques provided herein for fine-grain gesture control for Internet and computer navigation using 2D cameras can be readily extended to the manipulation of objects in 3D space. As previously explained with reference to FIGS. 10a-f, the user's hand creates an ovoid non-skintone element within the camera's image that can be analyzed temporally for X-Y cursor movements. As will be appreciated in light of this disclosure, the proportions of the ovoid shape change in predictable ways, as the user moves his/her hand through the six axes of motion (X-Y-Z and Pitch-Roll-Yaw). In accordance with an embodiment, additional information can be obtained by assessing the proportion of skintone surrounding the ovoid, as the user moves through the six axes of motion.

For example, and with reference to FIGS. 11a-f, the images for Roll (FIG. 11d) and Pitch (FIG. 11e) hand movements show how the $3^{rd}/4^{th}/5^{th}$ fingers are either less or more visible during these specific hand movements, while their proportions are fairly similar during X (FIG. 11a) and Y (FIG. 11b) and Z (FIG. 11c) and Yaw (FIG. 11f) hand movements. Another subtle but still detectable and therefore actionable distinction is that a Z motion gesture tends to show more of the fingernails in the upward portion of the gesture, as compared to the downward potion of the gesture. Likewise, a Yaw motion gesture tends to show a head-on perspective of the fingers in the one portion of the gesture, as compared to other portions of the gesture. Unlike 2D X-Y cursor movements which can utilize centroid tracking as discussed herein, 3D tracking of the hand must also take into account more complex articulation of the hand and wrist. For example, a simple lateral X motion, may actually include components of vertical Y movement and Roll-movement. Under typical 3D processing, these must be corrected to give the user's intended X component only.

Ovoid-Based Hand Gesture Methodology

Figure 12:
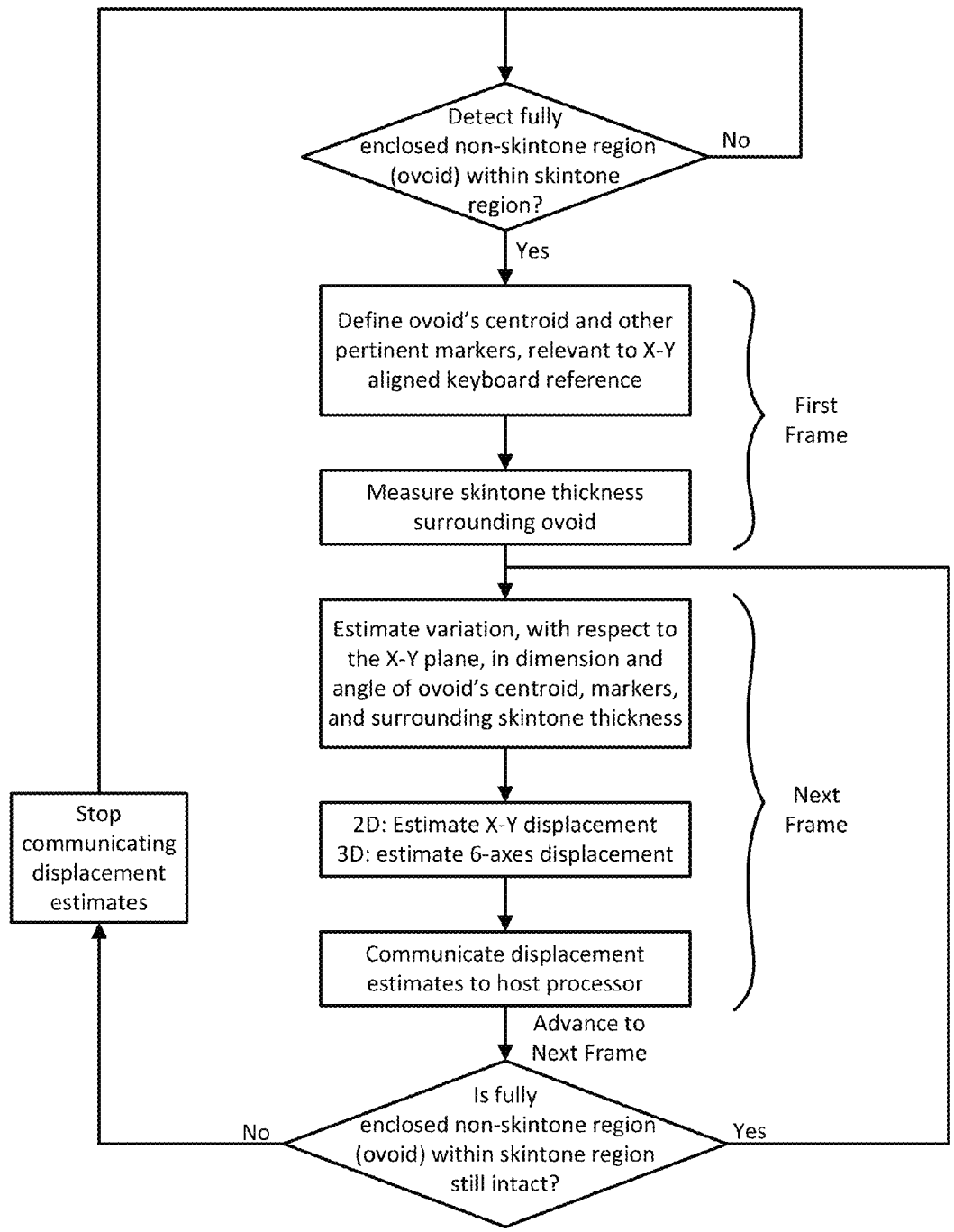
FIG. 12 illustrates a method for analyzing hand gesture video, in accordance with an embodiment of the techniques disclosed herein.

FIG. 12 illustrates a method for analyzing hand gesture video, in accordance with an embodiment. This method may be implemented in hardware or software or a combination thereof, and in one example embodiment is carried out by the Hand Parser and Gesture Recognition stages as previously described, which may be executed on the host computing system's CPU, in accordance with some embodiments. For instance, in some such embodiments, the Hand Parser stage can be configured to make the initial determination as to whether an ovoid-like area of non-skintone within a skintone region is present using spatial interpretation of the blob data produced by the Segmentation stage. If so, then processing is passed to the Gesture Recognition stage which can be configured to perform temporal interpretation of blob data to see changes from one frame of video to the next. However, numerous variations and embodiments will be apparent in light of this disclosure, and the gesture analysis techniques provided herein can be implemented in any suitable module or set of modules.

As can be seen, the method includes determining whether a fully enclosed non-skintone region (ovoid) within a skintone region has been detected. Recall that the Hand Parser stage can be configured to perform spatial interpretation of blob data, and that blob pixels (e.g., non-zero or "gray" pixels) can be readily distinguished from non-blob pixels (e.g., black pixel). If no non-skintone region ovoid within a skintone region has been detected, then the process continues to look for one. As shown in FIG. 2a, processing may be passed back to the Target Presence stage at this point.

Upon detection of a non-skintone ovoid within a skintone region of a given frame by the Hand Parser stage (or other module/stage), the method continues with defining the ovoid's centroid and other pertinent markers, relevant to X-Y aligned keyboard markered region reference. Example pertinent markers include, for instance, skin creases, knuckle redness, knuckle count, veins, hair, and other such identifiable features typical of a human hand. As will be appreciated, knowing the location of the ovoid's centroid allows other measurements to be made to assess the further details of the gesture (including movement in any of the 6 axes of motion).

The method continues with measuring skintone thickness surrounding ovoid captured in this initial frame. As will be appreciated, note that the reference to the first frame in FIG. 12 does not necessarily mean the first frame of the video stream, but rather represents the first frame of the video stream where a non-skintone ovoid within a skintone region has been detected. In any case, these thickness measurements can then be used in further assessing the nature of the gesture as captured in one or more subsequent frames of the video stream. For instance, in this particular embodiment, the method continues with analyzing the next frame by estimating variation, with respect to the X-Y plane, in dimension and angle of ovoid's centroid, markers, and surrounding skintone thickness. These variations can be measured, for instance, by evaluating features depicted in FIGS. 11a-f, which effectively characterize hand motion in the six axes, as previously explained. In addition to tracking movement of the ovoid centroid within the X-Y plane and measuring thickness of skintone about the non-skintone ovoid, any number of feature identification techniques can be employed to further increase the robustness of the evaluation (e.g., knuckle identification and tracking in the lateral direction associated with Yaw movement; fingernail identification and tracking in the vertical direction associated with Z movement. With respect to measuring skintone thickness, note that, for example, skintone thickness to the left of the ovoid in a Roll or Pitch movement varies significantly as the Roll commences.

As can further be seen with respect to FIG. 12, the method may be used to provide 2D analysis where X-Y displacement is estimated (based on the estimated variations made in X-Y motion), or to provide 3D analysis where 6-axes displacement is estimated (based on the estimated variations made in X-Y-Z and Roll-Pitch-Yaw motion). The method then continues with communicating calculated displacement estimates to the host processor (e.g., CPU of the graphics processing system). Given the containment provided by the markered region of the keyboard in this example case, computing such displacements can be done in a relatively efficient fashion.

The method continues with advancing to next frame and determining whether the fully enclosed non-skintone ovoid within skintone region still intact. If so, then processing repeats for that next frame to further assess how the gesture has progressed from the gesture of the last frame, and any relevant displacements can be computed based on movement with respect to two axes (for 2D processing) or six axes (for 3D processing) and passed to the host processor, which can then act on the received navigation command (e.g., click browser back button or favorites link; select hyperlink; open pull-down menu, minimize a window, launch a browser application, etc).

If, however, it is determined that the fully enclosed non-skintone ovoid within skintone region is no longer intact (because the user has opened the ovoid by separating the thumb and index figure, such as a mouse button release), then the method continues by ceasing communication of the displacement estimates to the CPU and continuing to monitor subsequent frames for presence of a new non-skintone ovoid within a skintone region and the process repeats accordingly.

Numerous variations will be apparent in light of this disclosure. For instance, the method may be equally application to detecting a partial non-skintone ovoid within a skintone region (such as shown in FIGS. 10d-10f) for processing a mouse double-click. Further note that, assuming the user has two hands, it also possible to interpret the interactions of the two corresponding distinct ovoid non-skintone elements (left hand, right hand) in the camera image. Such dual handed processing may be utilized, for example, in gaining applications and other higher-level applications, whereas basic computer and Internet navigation gestures may be carried out using just one hand.

Example System

Figure 13:
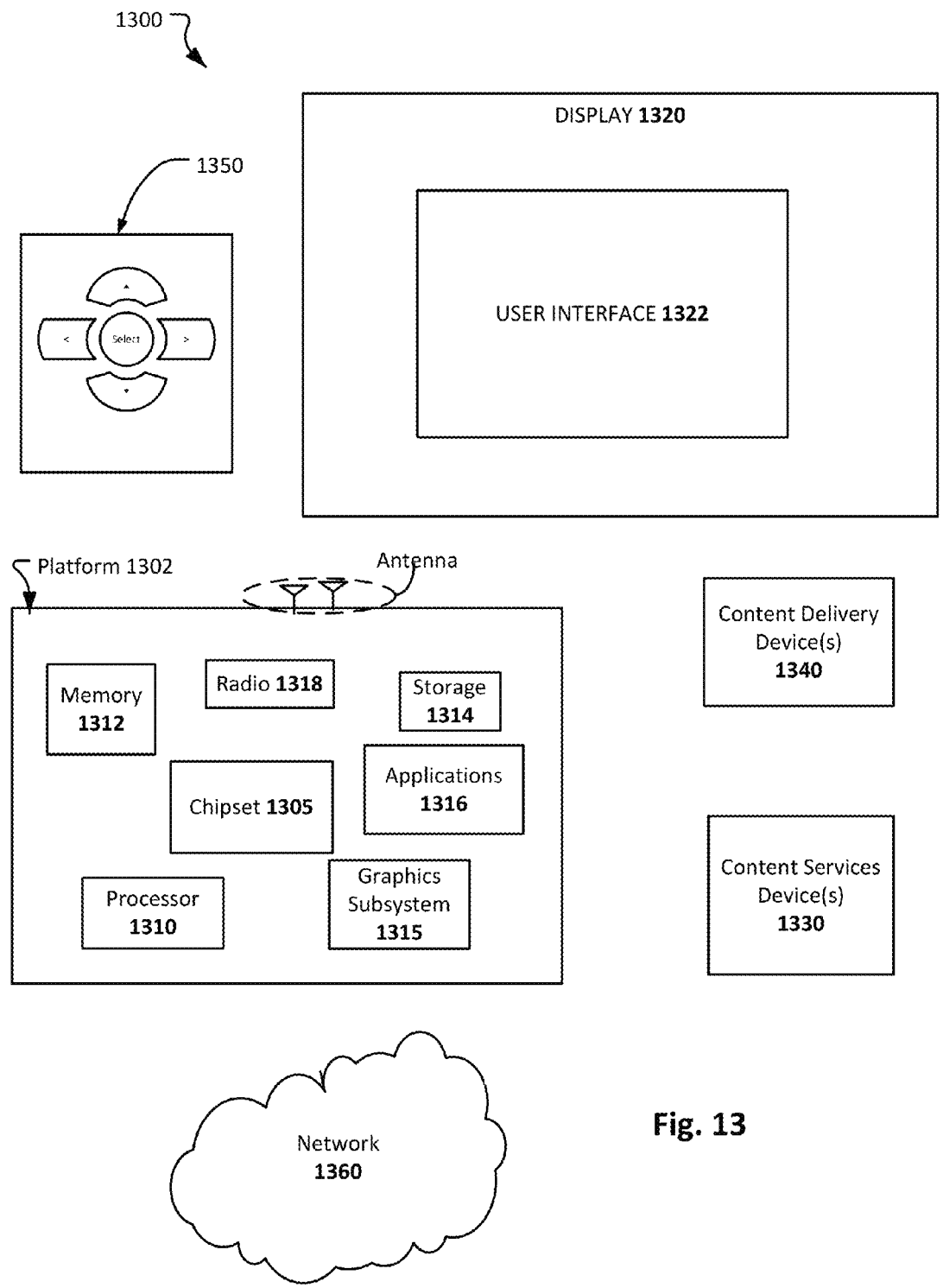
FIG. 13 illustrates a media system configured in accordance with an embodiment of the techniques disclosed herein.

FIG. 13 illustrates an example system 1300 that may carry out stepped and distributed gesture pre-preprocessing of video content as described herein, in accordance with some embodiments. In some embodiments, system 1300 may be a media system although system 1300 is not limited to this context. For example, system 1300 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, set-top box, game console, or other such computing environments capable of performing graphics rendering operations.

In some embodiments, system 1300 comprises a platform 1302 coupled to a display 1320. Platform 1302 may receive content from a content device such as content services device(s) 1330 or content delivery device(s) 1340 or other similar content sources. A navigation controller 1350 comprising one or more navigation features may be used to interact with, for example, platform 902 and/or display 920, so as to supplement navigational gesturing by the user (such as complete and partial ovoid-based gesturing as described herein). Each of these example components is described in more detail below.

In some embodiments, platform 1302 may comprise any combination of a chipset 1305, processor 1310, memory 1312, storage 1314, graphics subsystem 1315, applications 1316 and/or radio 1318. Chipset 1305 may provide intercommunication among processor 1310, memory 1312, storage 1314, graphics subsystem 1315, applications 1316 and/or radio 1318. For example, chipset 1305 may include a storage adapter (not depicted) capable of providing intercommunication with storage 1314.

Processor 1310 may be implemented, for example, as Complex Instruction Set Computer (CISC) or Reduced Instruction Set Computer (RISC) processors, x86 instruction set compatible processors, multi-core, or any other microprocessor or central processing unit (CPU). In some embodiments, processor 1310 may comprise dual-core processor(s), dual-core mobile processor(s), and so forth. Memory 1312 may be implemented, for instance, as a volatile memory device such as, but not limited to, a Random Access Memory (RAM), Dynamic Random Access Memory (DRAM), or Static RAM (SRAM). Storage 1314 may be implemented, for example, as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, storage 1314 may comprise technology to increase the storage performance enhanced protection for valuable digital media when multiple hard drives are included, for example.

Graphics subsystem 1315 may perform processing of images such as still or video for display. Graphics subsystem 1315 may be a graphics processing unit (GPU) or a visual processing unit (VPU), for example. An analog or digital interface may be used to communicatively couple graphics subsystem 1315 and display 1320. For example, the interface may be any of a High-Definition Multimedia Interface, DisplayPort, wireless HDMI, and/or wireless HD compliant techniques. Graphics subsystem 1315 could be integrated into processor 1310 or chipset 1305. Graphics subsystem 1315 could be a stand-alone card communicatively coupled to chipset 1305. The stepped and distributed graphics and/or video processing techniques described herein may be implemented in various hardware architectures (e.g., GP-Circuitry in the camera silicon proximate to the camera). In still another embodiment, the graphics and/or video functions including some of the distributed pre-processing stages (e.g., Hand Parser and Gesture Recognition) may be implemented by a general purpose processor, including a multi-core processor. In still other cases, a co-located or discrete GPU processor may be used (e.g., Segmentation stage).

Radio 1318 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 918 may operate in accordance with one or more applicable standards in any version.

In some embodiments, display 1320 may comprise any television or computer type monitor or display. Display 1320 may comprise, for example, a liquid crystal display (LCD) screen, electrophoretic display (EPD) or liquid paper display, flat panel display, touch screen display, television-like device, and/or a television. Display 1320 may be digital and/or analog. In some embodiments, display 1320 may be a holographic or three-dimensional display. Also, display 1320 may be a transparent surface that may receive a visual projection. Such projections may convey various forms of information, images, and/or objects. For example, such projections may be a visual overlay for a mobile augmented reality (MAR) application. Under the control of one or more software applications 1316, platform 1302 may display a user interface 1322 on display 1320.

In some embodiments, content services device(s) 1330 may be hosted by any national, international and/or independent service and thus accessible to platform 1302 via the Internet or other network, for example. Content services device(s) 1330 may be coupled to platform 1302 and/or to display 1320. Platform 1302 and/or content services device(s) 1330 may be coupled to a network 1360 to communicate (e.g., send and/or receive) media information to and from network 1360. Content delivery device(s) 1340 also may be coupled to platform 1302 and/or to display 1320. In some embodiments, content services device(s) 1330 may comprise a cable television box, personal computer, network, telephone, Internet enabled devices or appliance capable of delivering digital information and/or content, and any other similar device capable of unidirectionally or bidirectionally communicating content between content providers and platform 1302 and/display 1320, via network 1360 or directly. It will be appreciated that the content may be communicated unidirectionally and/or bidirectionally to and from any one of the components in system 1300 and a content provider via network 1360. Examples of content may include any media information including, for example, video, music, graphics, text, medical and gaming content, and so forth.

Content services device(s) 1330 receives content such as cable television programming including media information, digital information, and/or other content. Examples of content providers may include any cable or satellite television or radio or Internet content providers. The provided examples are not meant to limit the present disclosure. In some embodiments, platform 1302 may receive control signals from navigation controller 1350 having one or more navigation features. The navigation features of controller 1350 may be used to interact with user interface 1322, for example. In some embodiments, navigation controller 1350 may be a pointing device that may be a computer hardware component (specifically human interface device) that allows a user to input spatial (e.g., continuous and multi-dimensional) data into a computer. As will be appreciated, navigation gestures as described herein can be used as an alternative to such a navigation controller 1350, or to augment such user input modalities. Thus, various disclosures herein with respect to the navigation controller 1350 can equally be applied to such navigation gestures (except that the processing path will be different for controller 1350 input relative to hand gesture input), as will be appreciated in light of this disclosure. Many systems such as graphical user interfaces (GUI), and televisions and monitors allow the user to control and provide data to the computer or television using physical gestures.

Movements of the navigation features of controller 1350 may be echoed on a display (e.g., display 1320) by movements of a pointer, cursor, focus ring, or other visual indicators displayed on the display. For example, under the control of software applications 1316, the navigation features located on navigation controller 1350 may be mapped to virtual navigation features displayed on user interface 1322, for example. In some embodiments, controller 1350 may not be a separate component but integrated into platform 1302 and/or display 1320. Embodiments, however, are not limited to the elements or in the context shown or described herein, as will be appreciated.

In some embodiments, drivers (not shown) may comprise technology to enable users to instantly turn on and off platform 1302 like a television with the touch of a button after initial boot-up, when enabled, for example. Program logic may allow platform 1302 to stream content to media adaptors or other content services device(s) 1330 or content delivery device(s) 1340 when the platform is turned "off." In addition, chip set 1305 may comprise hardware and/or software support for 5.1 surround sound audio and/or high definition 7.1 surround sound audio, for example. Drivers may include a graphics driver for integrated graphics platforms. In some embodiments, the graphics driver may comprise a peripheral component interconnect (PCI) express graphics card.

In various embodiments, any one or more of the components shown in system 1300 may be integrated. For example, platform 1302 and content services device(s) 1330 may be integrated, or platform 1302 and content delivery device(s) 1340 may be integrated, or platform 1302, content services device(s) 1330, and content delivery device(s) 1340 may be integrated, for example. In various embodiments, platform 1302 and display 1320 may be an integrated unit. Display 1320 and content service device(s) 1330 may be integrated, or display 1320 and content delivery device(s) 1340 may be integrated, for example. These examples are not meant to limit the present disclosure.

In various embodiments, system 1300 may be implemented as a wireless system, a wired system, or a combination of both. When implemented as a wireless system, system 1300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 1302 may establish one or more logical or physical channels to communicate information. The information may include media information and control information. Media information may refer to any data representing content meant for a user. Examples of content may include, for example, data from a voice conversation, videoconference, streaming video, email or text messages, voice mail message, alphanumeric symbols, graphics, image, video, text and so forth. Control information may refer to any data representing commands, instructions or control words meant for an automated system. For example, control information may be used to route media information through a system, or instruct a node to process the media information in a predetermined manner (e.g., using hardware assisted for privilege access violation checks as described herein). The embodiments, however, are not limited to the elements or context shown or described in FIG. 13.

Figure 14:
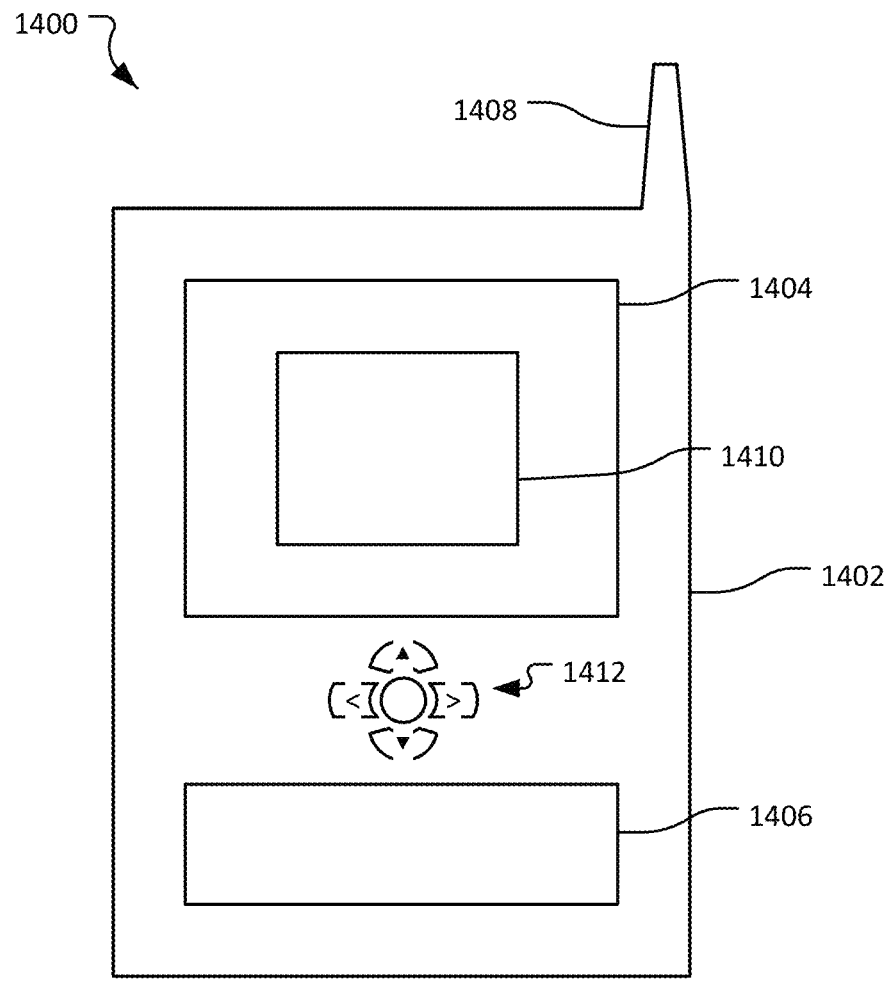
FIG. 14 illustrates a mobile computing system configured in accordance with an embodiment of the techniques disclosed herein.

As described above, system 1300 may be embodied in varying physical styles or form factors. FIG. 14 illustrates embodiments of a small form factor device 1400 in which system 1300 may be embodied. In some embodiments, for example, device 1400 may be implemented as a mobile computing device having wireless capabilities. A mobile computing device may refer to any device having a processing system and a mobile power source or supply, such as one or more batteries, for example.

As previously described, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In some embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 14, device 1400 may comprise a housing 1402, a display 1404, an input/output (I/O) device 1406, and an antenna 1408. Device 1400 also may comprise navigation features 1412. Display 1404 may comprise any suitable display unit for displaying information appropriate for a mobile computing device. I/O device 1406 may comprise any suitable I/O device for entering information into a mobile computing device. Examples for I/O device 1406 may include an alphanumeric keyboard, a numeric keypad, a touch pad, input keys, buttons, a camera, switches, rocker switches, microphones, speakers, voice recognition device and software, and so forth. Information also may be entered into device 1400 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Whether hardware elements and/or software elements are used may vary from one embodiment to the next in accordance with any number of factors, such as desired computational rate, power levels, heat tolerances, processing cycle budget, input data rates, output data rates, memory resources, data bus speeds and other design or performance constraints.

Some embodiments may be implemented, for example, using a machine-readable medium or article which may store an instruction or a set of instructions that, if executed by a machine, may cause the machine to perform a method and/or operations in accordance with an embodiment. Such a machine may include, for example, any suitable processing platform, computing platform, computing device, processing device, computing system, processing system, computer, processor, or the like, and may be implemented using any suitable combination of hardware and software. The machine-readable medium or article may include, for example, any suitable type of non-transient memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of executable code implemented using any suitable high-level, low-level, object-oriented, visual, compiled and/or interpreted programming language.

Further Example Embodiments

The following examples pertain to further embodiments, from which numerous permutations and configurations will be apparent.

Example 1 is system for processing a raw video stream, comprising: a threshold detection stage configured to determine if a current frame of the video stream is sufficiently different from a previous frame of the video stream, and in response to the current frame not being sufficiently different than the previous frame, the threshold detection stage is further configured to stop further processing of the current frame by a subsequent stage; a target presence stage configured to determine if the current frame includes skintone colored pixels, and in response to the current frame not including skintone colored pixels, the target presence stage is further configured to stop further processing of the current frame by a subsequent stage; and a gesture processing stage configured to perform at least one of spatial and temporal interpretation of image data within frames passed by the threshold detection and target presence stages.

Example 2 includes the subject matter of Example 1, wherein image processing and communication of pixel information which lies outside a markered region is eliminated or otherwise suppressed.

Example 3 includes the subject matter of Example 2, wherein the markered region is a subset of a given field of view.

Example 4 includes the subject matter of Example 2, wherein the markered region is aligned with a user input device. In some such cases, the markered region is defined by a perimeter of that user input device.

Example 5 includes the subject matter of Example 4, wherein the user input device is a keyboard. In some such cases, the markered region is defined by a perimeter of that keyboard.

Example 6 includes the subject matter of Example 2, wherein the markered region is aligned with a mouse pad. In some such cases, the markered region is defined by a perimeter of that mouse pad.

Example 7 includes the subject matter of any one of Examples 2-6, wherein a number of pixels evaluated by the system is a subset of the markered region.

Example 8 includes the subject matter of Example 7, wherein the subset is one of a pixel-scanline and a partial-pixel-scanline.

Example 9 includes the subject matter of Example 7, wherein the subset is a single pixel.

Example 10 includes the subject matter of any one of Examples 1-9 wherein image processing and communication of pixel information which lies outside a markered region is eliminated or otherwise suppressed, and the markered region is a user-configurable subset of a given field of view.

Example 11 includes the subject matter of Example 1-10, wherein the gesture processing stage is further configured to perform at least one of spatial and temporal interpretation only on image data within a markered region of a given field of view.

Example 12 includes the subject matter of Example 11, wherein the markered region is aligned with a keyboard or mouse pad or a desk area. In some such cases, the markered region is defined by a perimeter of that keyboard, mouse pad, or desk area.

Example 13 includes the subject matter of Example 12, wherein image processing and communication of pixel information which lies outside the markered region is eliminated or otherwise suppressed.

Example 14 includes the subject matter of Example 13, wherein a number of pixels evaluated is a subset of the markered region.

Example 15 includes the subject matter of any of Examples 1 through 14, wherein the threshold detection stage is configured to sum and compare a luma channel of the current frame with a luma channel of the previous frame, and if the delta between the current and previous frames is above a given threshold, then data of the current frame is passed to the target presence stage for further processing.

Example 16 includes the subject matter of any one of Examples 1 through 15, wherein the target presence stage is configured to convert data of the current frame into one or more HSV pixels, and if a sufficient number of skintone colored pixels are found, then data of the current frame is passed to a next processing stage.

Example 17 includes the subject matter of Example 16, wherein the next processing stage is a segmentation stage configured to separate pixels of interest from pixels that are not of interest, wherein pixels of interest are represented as blobs and pixels not of interest are represented by non-blobs.

Example 18 includes the subject matter of Example 17, wherein the segmentation stage is configured to at least one of eliminate disperse pixels due to camera noise and/or lighting, and/or process imaged data using erode and/or dilate morphing methods.

Example 19 includes the subject matter of Example 17 or 18, wherein the segmentation stage is implemented in a graphics processing unit (GPU).

Example 20 includes the subject matter of any one of Examples 17-19, wherein the gesture processing stage includes a parser stage that is configured to perform spatial interpretation of blob data received from the segmentation stage.

Example 21 includes the subject matter of Example 20, wherein the parser stage is configured to perform spatial interpretation by mapping the blob data to a model of target human anatomical geometry.

Example 22 includes the subject matter of Example 21, wherein the target human anatomical geometry is a hand.

Example 23 includes the subject matter of any one of Examples 20-22, wherein the parser stage is configured to perform spatial interpretation of the blob data to identify the presence of an ovoid-like area of non-skintone within a skintone region.

Example 24 includes the subject matter of Example 23, wherein the ovoid-like area of non-skintone within a skintone region is one of fully closed or partially closed.

Example 25 includes the subject matter of any one of Examples 20-24, wherein the gesture processing stage further includes a gesture recognition stage that is configured to perform temporal interpretation of blob data received from the parser stage.

Example 26 includes the subject matter of Example 25, wherein at least one of the segmentation, parser, and/or gesture recognition stages are configured to send feedback to at least one of the threshold detection and/or target presence stages.

Example 27 includes the subject matter of Example claims 25 and 26, wherein at least one of the threshold detection and target presence stages are implemented within or proximate to a camera deployable at a first location and having a field of view that includes a user input area, and the segmentation, parser and gesture recognition stages are at one or more locations different from the first location.

Example 28 includes the subject matter of any of Examples 17-27, wherein the segmentation stage is implemented in a graphics processing unit, and the parser and gesture recognition stages are implemented by application software.

Example 29 includes the subject matter of any of Examples 1-28, wherein the threshold detection and target presence stages are implemented within a display.

In Example 30, the subject matter of any of Examples 1-29 can optionally include an application programming interface (API) for operatively coupling one or more of the stages to a computing platform in which the system is configured to operate.

Example 31a includes the subject matter of Example 30, wherein the API is presented as an extended universal serial bus human interface (USB HID) class device.

Example 31b includes the subject matter of Example 30 or 31a, wherein the API includes security/privacy policies.

Example 32 comprises an imaging device that includes the subject matter of any of Examples 1 through 31b and a camera operatively coupled to the system.

Example 33 includes the subject matter of Example 32 wherein, at least one of the threshold detection stage and the target presence stage are implemented within sensor circuitry of the camera.

Example 34 comprises a display that includes the subject matter of any of Examples 1 through 31b.

Example 35 includes the subject matter of Example 34, wherein at least one of the threshold detection stage and the target presence stage are implemented within sensor circuitry of a camera integrated within the display.

Example 36 includes is a computer navigation method using a raw video stream, comprising: determining, at a first processing stage, if a current frame of the video stream is sufficiently different from a previous frame of the video stream, and in response to the current frame not being sufficiently different than the previous frame, stopping further processing of the current frame by a subsequent stage; determining, at a second processing stage, if the current frame includes skintone colored pixels, and in response to the current frame not including skintone colored pixels, stopping further processing of the current frame by a subsequent stage; receiving, at a third processing stage, data from the current frame and separating pixels of interest from pixels that are not of interest, wherein pixels of interest are represented as blobs and pixels not of interest are represented by non-blobs; performing, at a fourth processing stage, spatial interpretation of blob data received from the third processing stage by mapping the blob data to human hand geometry; performing, at a fifth processing stage, temporal interpretation of blob data received from the fourth processing stage to identify a user navigation gesture; and directing a computing system based on the user navigation gesture; wherein the processing stages are configured in a stepped and distributed arrangement and image processing and communication of pixel information which lies outside a markered region is eliminated or otherwise suppressed.

Example 37 includes the subject matter of Example 36, wherein the markered region is a subset of a given field of view.

Example 38 includes the subject matter of any of Examples 36-37, wherein a number of pixels evaluated by at least one the processing stages is a subset of the markered region.

Example 39 includes the subject matter of Example 38, wherein the subset of the markered region is one of a pixel-scanline, a partial-pixel-scanline, and a single pixel.

Example 40 includes the subject matter of any one of Examples 36-39, wherein the markered region is aligned with a keyboard or a mouse pad or a desk area. In some such cases, the markered region is defined by a perimeter of that keyboard, mouse pad or desk area.

Example 41 includes the subject matter of any one of Examples 36-39, wherein the markered region is a user-configurable subset of a given field of view.

Example 42 is a non-transient computer readable medium or computer program product encoded with instructions that when executed by one or more processors causes a navigation method to be carried out using a raw video stream. The method may include the subject matter of any one of Examples 36-41, for instance, or any computer-implementable functionality as variously described in Examples 1-35.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously or otherwise demonstrated disclosed herein.

What is claimed is:

1. A system for processing a raw video stream, comprising:
    a threshold detection stage comprising integrated circuitry configured to determine if a current frame of the video stream is sufficiently different from a previous frame of the video stream, and in response to the current frame not being sufficiently different than the previous frame, the threshold detection stage is further configured to stop further processing of the current frame by a subsequent stage;
    a target presence stage comprising integrated circuitry configured to determine if the current frame includes skintone colored pixels, and in response to the current frame not including skintone colored pixels, the target presence stage is further configured to stop further processing of the current frame by a subsequent stage; and
    a gesture processing stage configured to perform at least one of spatial and temporal interpretation of image data within frames passed by the threshold detection and target presence stages.

2. The system of claim 1 wherein image processing and communication of pixel information which lies outside a markered region is eliminated, and the markered region is a subset of a given field of view.

3. The system of claim 2 wherein the markered region is aligned with a user input device, or a mouse pad, or a desk area.

4. The system of claim 2 wherein the markered region is aligned with a keyboard and is defined by a perimeter of the keyboard.

5. The system of claim 2 wherein the markered region is aligned with a mouse pad and is defined by a perimeter of the mouse pad.

6. The system of claim 2 wherein a number of pixels evaluated by the system is a subset of the markered region.

7. The system of claim 6 wherein the subset is one of a pixel-scanline, a partial-pixel-scanline, and a single pixel.

8. The system of claim 1 wherein image processing and communication of pixel information which lies outside a markered region is eliminated, and the markered region is a user-configurable subset of a given field of view.

9. The system of claim 1 wherein the gesture processing stage is further configured to perform at least one of spatial and temporal interpretation only on image data within a markered region of a given field of view.

10. The system of claim 1 wherein the target presence stage is configured to convert data of the current frame into one or more HSV pixels, and if a sufficient number of skintone colored pixels are found, then data of the current frame is passed to a segmentation stage configured to separate pixels of interest from pixels that are not of interest, wherein pixels of interest are represented as blobs and pixels not of interest are represented by non-blobs.

11. The system of claim 10 wherein the segmentation stage is implemented in a graphics processing unit (GPU).

12. The system of any one of claim 10 wherein the gesture processing stage includes a parser stage that is configured to perform spatial interpretation of blob data received from the segmentation stage.

13. The system of claim 12 wherein the parser stage is configured to perform spatial interpretation of the blob data to identify the presence of an ovoid-like area of non-skintone within a skintone region, and wherein the ovoid-like area of non-skintone within a skintone region is one of fully closed or partially closed.

14. The system of claim 12 wherein the gesture processing stage further includes a gesture recognition stage that is configured to perform temporal interpretation of blob data received from the parser stage.

15. The system of claim 14 wherein at least one of the threshold detection and target presence stages are implemented within or proximate to a camera deployable at a first location and having a field of view that includes a user input area, and the segmentation, parser and gesture recognition stages are at one or more locations different from the first location.

16. The system of claim 14 wherein the segmentation stage is implemented in a graphics processing unit, and the parser and gesture recognition stages are implemented by application software.

17. The system of claim 1 further comprising an application programming interface (API) for operatively coupling one or more of the stages to a computing platform in which the system is configured to operate.

18. An imaging device comprising the system of claim 1 and a camera operatively coupled to the system, wherein at least one of the threshold detection stage and the target presence stage are implemented within sensor circuitry of the camera.

19. A display comprising the system of claim 1 wherein at least one of the threshold detection stage and the target presence stage are implemented within sensor circuitry of a camera integrated within the display.

20. A computer navigation method using a raw video stream, comprising:
    determining, at a first processing stage, if a current frame of the video stream is sufficiently different from a previous frame of the video stream, and in response to the current frame not being sufficiently different than the previous frame, stopping further processing of the current frame by a subsequent stage;
    determining, at a second processing stage, if the current frame includes skintone colored pixels, and in response to the current frame not including skintone colored pixels, stopping further processing of the current frame by a subsequent stage;
    receiving, at a third processing stage, data from the current frame and separating pixels of interest from pixels that are not of interest, wherein pixels of interest are represented as blobs and pixels not of interest are represented by non-blobs;

performing, at a fourth processing stage, spatial interpretation of blob data received from the third processing stage by mapping the blob data to human hand geometry;

performing, at a fifth processing stage, temporal interpretation of blob data received from the fourth processing stage to identify a user navigation gesture; and directing a computing system based on the user navigation gesture;

wherein the processing stages are configured in a stepped and distributed arrangement and image processing and communication of pixel information which lies outside a markered region is eliminated.

21. The method of claim 20 wherein the markered region is a subset of a given field of view and is aligned with a keyboard or a mouse pad or a desk area, and a number of pixels evaluated by at least one the processing stages is a subset of the markered region.

22. A non-transient computer program product encoded with instructions that when executed by one or more processors causes a navigation method to be carried out using a raw video stream, the method comprising:

determining, at a first processing stage, if a current frame of the video stream is sufficiently different from a previous frame of the video stream, and in response to the current frame not being sufficiently different than the previous frame, stopping further processing of the current frame by a subsequent stage;

determining, at a second processing stage, if the current frame includes skintone colored pixels, and in response to the current frame not including skintone colored pixels, stopping further processing of the current frame by a subsequent stage; and performing, at a stage subsequent to the first and second processing stages, at least one of spatial and temporal interpretation of image data within frames passed by the threshold detection and target presence stages;

wherein image processing and communication of pixel information which lies outside a markered region is eliminated.

23. The computer readable medium of claim 22 wherein the markered region is a subset of a given field of view and is aligned with a keyboard and defined by a perimeter of that keyboard.

24. The computer readable medium of claim 23 wherein a number of pixels evaluated by at least one the processing stages is a subset of the markered region.

25. The computer readable medium of claim 22 wherein the markered region is a user-configurable subset of a given field of view.

26. The computer readable medium of claim 22 wherein the performing comprises at least one of:

receiving, at a third processing stage, data from the current frame and separating pixels of interest from pixels that are not of interest, wherein pixels of interest are represented as blobs and pixels not of interest are represented by non-blobs;

performing, at a fourth processing stage, spatial interpretation of blob data received from the third processing stage by mapping the blob data to human hand geometry; and performing, at a fifth processing stage, temporal interpretation of blob data received from the fourth processing stage to identify a user navigation gesture.

27. The computer readable medium of claim 26 further comprising:

directing a computing system based on the user navigation gesture.

* * * * *

UNITED STATES PATENT AND TRADEMARK OFFICE
CERTIFICATE OF CORRECTION

PATENT NO.        : 8,761,448 B1
APPLICATION NO.   : 13/800910
DATED             : June 24, 2014
INVENTOR(S)       : Jeremy Burr Page 1 of 1

It is certified that error appears in the above-identified patent and that said Letters Patent is hereby corrected as shown below:

In the Claims

In column 38 line 13, Claim 12, please delete "of any one of" and insert -- of --.

Signed and Sealed this
Second Day of September, 2014

Michelle K. Lee
*Deputy Director of the United States Patent and Trademark Office*